(12) United States Patent
Miyashita et al.

(10) Patent No.: US 10,643,650 B2
(45) Date of Patent: May 5, 2020

(54) INFORMATION RECORDING DEVICE AND DATA ERASING METHOD

(71) Applicant: Panasonic Intellectual Property Management Co., Ltd., Osaka (JP)

(72) Inventors: Harumitsu Miyashita, Nara (JP); Naohiro Kimura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/292,515

(22) Filed: Mar. 5, 2019

(65) Prior Publication Data

US 2019/0279676 A1 Sep. 12, 2019

(30) Foreign Application Priority Data

Mar. 6, 2018 (JP) ................................. 2018-039688

(51) Int. Cl.
*G11B 7/0055* (2006.01)
*G11B 7/0037* (2006.01)
*G11B 7/006* (2006.01)

(52) U.S. Cl.
CPC .......... *G11B 7/0037* (2013.01); *G11B 7/0055* (2013.01); *G11B 7/006* (2013.01); *G11B 7/0062* (2013.01); *G11B 7/00552* (2013.01); *G11B 7/00555* (2013.01); *G11B 7/00557* (2013.01)

(58) Field of Classification Search
None
See application file for complete search history.

(56) References Cited

U.S. PATENT DOCUMENTS

| | | | | |
|---|---|---|---|---|
| 2004/0174792 | A1* | 9/2004 | Miyamoto | G11B 7/00745 369/59.25 |
| 2006/0023596 | A1* | 2/2006 | Ogawa | G11B 20/00086 369/53.2 |
| 2006/0083130 | A1* | 4/2006 | Park | G11B 7/006 369/47.1 |

(Continued)

FOREIGN PATENT DOCUMENTS

| | | |
|---|---|---|
| JP | 04-255970 | 9/1992 |
| JP | 2002-117546 | 4/2002 |

(Continued)

OTHER PUBLICATIONS

International Search Report dated Sep. 27, 2016 in International (PCT) Application No. PCT/JP2016/003077.

*Primary Examiner* — Tan X Dinh
(74) *Attorney, Agent, or Firm* — Wenderoth, Lind & Ponack, L.L.P.

(57) ABSTRACT

In an information recording device, when receiving an erase command by a receiver, a controller erases data of an erased area by overwriting data in an information area, to corrupt the data in the information area, using an erasing pattern. The erased area is specified by an erase start position and a size of the data to be erased on the optical disc. The data in the information area is arranged as partial data in a series of data arranged in a direction of internal parity of error correction so that correction is disabled in both of a correction processing by the internal parity of the error correction and a correction processing by external parity of the error correction when the data in the information area is overwritten using the erasing pattern.

10 Claims, 19 Drawing Sheets

(56) References Cited

U.S. PATENT DOCUMENTS

| | | |
|---|---|---|
| 2006/0288263 A1 | 12/2006 | Nakamura |
| 2007/0297309 A1 | 12/2007 | Yasukawa et al. |
| 2008/0270712 A1* | 10/2008 | Hwang .............. G11B 20/1883 |
| | | 711/155 |
| 2011/0305124 A1* | 12/2011 | Imai ..................... G11B 7/0062 |
| | | 369/47.5 |

FOREIGN PATENT DOCUMENTS

| | | |
|---|---|---|
| JP | 2005-196903 | 7/2005 |
| JP | 2006-48763 | 2/2006 |
| JP | 2008-4182 | 1/2008 |
| JP | 2008-181574 | 8/2008 |
| JP | 2010-80053 | 4/2010 |
| JP | 2012-3798 | 1/2012 |
| JP | 2013-186930 | 9/2013 |

* cited by examiner

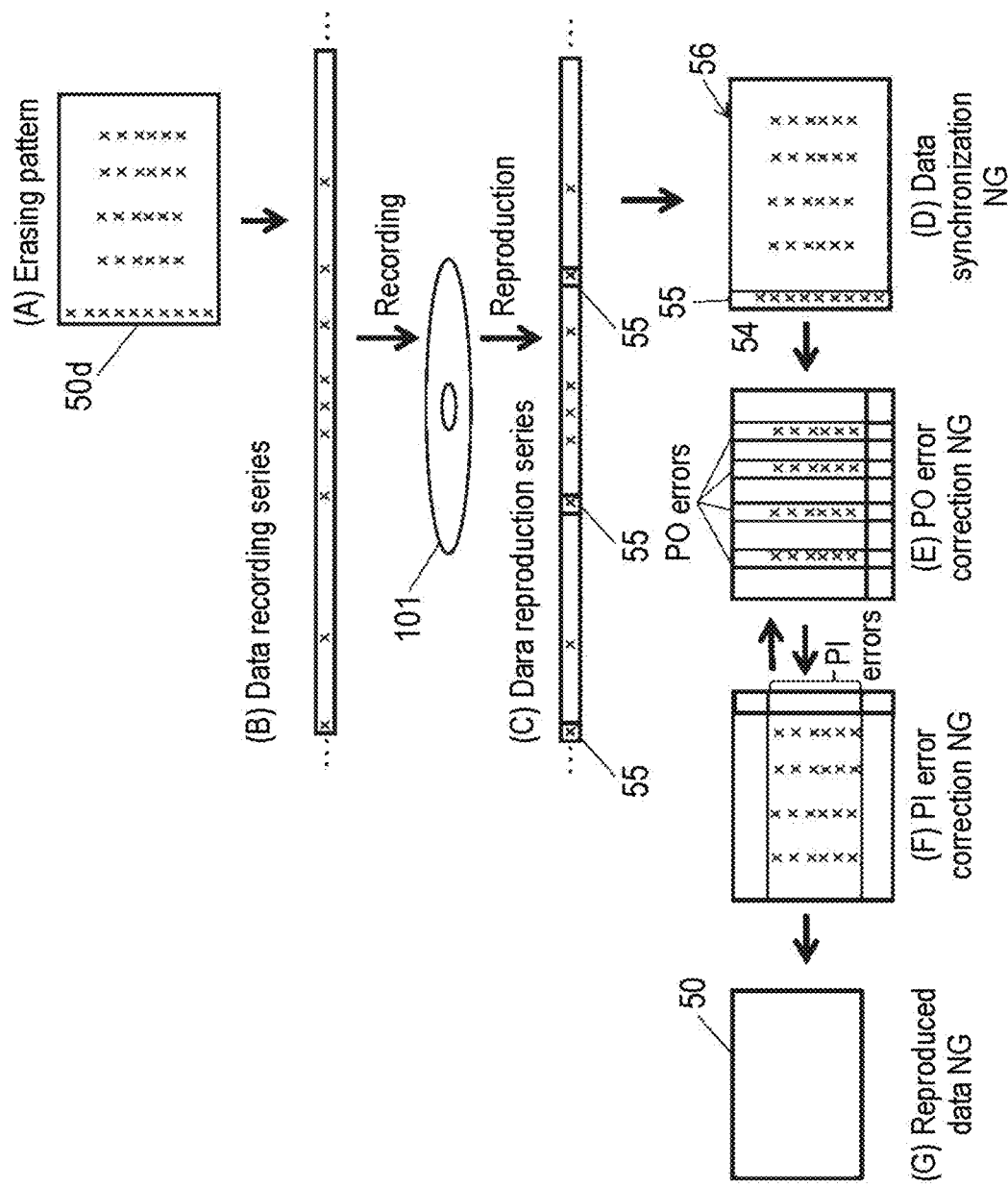

INFORMATION RECORDING DEVICE AND DATA ERASING METHOD

CROSS REFERENCE TO RELATED APPLICATIONS

This application is based on Japanese Patent Application (No. 2018-039688) filed on Mar. 6, 2018, the contents of which are incorporated herein by reference.

BACKGROUND

1. Technical Field

The present disclosure relates to a method and a device for erasing data recorded in a write-once optical disc.

2. Description of Related Art

The write-once optical disc is a recording medium that records information in an additional manner, in which data recorded once cannot be rewritten. However, from a viewpoint of preventing leakage of information, it is required that the data recorded in the write-once optical disc be erased. For such a request, Unexamined Japanese Patent Publication No. 2006-048763 discloses an erasing method of the data recorded in the write-once optical disc. In Unexamined Japanese Patent Publication No. 2006-048763, data, which is modulated by a modulation method of a same run length limit as a run length limit of a modulation method for use in recording data, is overwritten to the already recorded data in the write-once optical disc. In this way, the data is corrupted and made non-reproducible, and the data is erased.

SUMMARY

In a case of erasing the data by such overwriting in the write-once optical disc in accordance with the above-mentioned method, a recording mark is newly formed in a space of an area of the data to be erased. Meanwhile, on the optical disc, in order to obtain a stable servo signal in servo control, a recording mark is formed so that an area of the recording mark and an area of a space (portion on which the recording mark is not formed) can become substantially equal to each other.

If an amount of the data to be corrupted is increased in order to increase reliability of the erasing, then an amount of such newly formed recording marks is increased. Therefore, a ratio of the recording mark area to the space area is increased, and accordingly, there is a possibility that quality of a servo signal in the servo control may be degraded and it may become impossible to perform the stable servo control.

The present disclosure provides an information recording device capable of realizing the data erasing of the write-once optical disc with high reliability without affecting stability of the servo.

In a first aspect of the present disclosure, there is provided an information recording device capable of erasing data recorded in a write-once optical disc. The information recording device includes a receiver that receives an erase command in which an erase start position and a size of data to be erased are designated, an optical head that forms a recording mark to the optical disc, and a controller that controls the formation of the recording mark to the optical disc. Upon receiving the erase command, the controller corrupts data of an area in which information necessary for synchronization at a time of reproducing the data is recorded, the area being included in an erased area on the optical disc, the erased area being determined by the erase start position and the size of the data to be erased, by overwriting the data of the area by an erasing pattern, and thus erases data of the erased area.

In a second aspect of the present disclosure, there is provided a data erasing method for erasing data recorded in a write-once optical disc. The data erasing method receives an erase command in which an erase start position and a size of the data to be erased are designated. Moreover, the data erasing method corrupts data of an area in which information necessary for synchronization at a time of reproducing the data is recorded, the area being included in an erased area on the optical disc, the erased area being determined by the erase start position and the size of the data to be erased, by overwriting the data of the area by an erasing pattern, and thus erases data of the erased area.

The information recording device according to the disclosure makes it possible to prevent reduction of the quality of a servo signal and thereby secure stability of a servo control. Furthermore, since the information recording device according to the disclosure corrupts data that is necessary for synchronization in data reproduction, it can disable data reproduction reliably and erase data reliably.

BRIEF DESCRIPTION OF DRAWINGS

FIG. 19 illustrates how to erase data recorded on an optical disc and why erased data cannot be reproduced.

DETAILED DESCRIPTION

Hereinafter, exemplary embodiments will be described in detail with reference to the drawings appropriately. However, a description more in detail than necessary is omitted in some cases. For example, a detailed description of a well-known matter and a duplicate description of substantially the same configuration are omitted in some cases. These omissions are made in order to avoid unnecessary redundancy of the following description and to facilitate the understanding of those skilled in the art.

Note that the inventors of the present disclosure provide the accompanying drawings and the following description in order to allow those skilled in the art to fully understand the present disclosure, and do not intend to thereby limit the subject of the description of the scope of claims.

First Exemplary Embodiment

1. Configuration 1.1 Configuration of Information Recording/Reproducing Device

Figure 1:
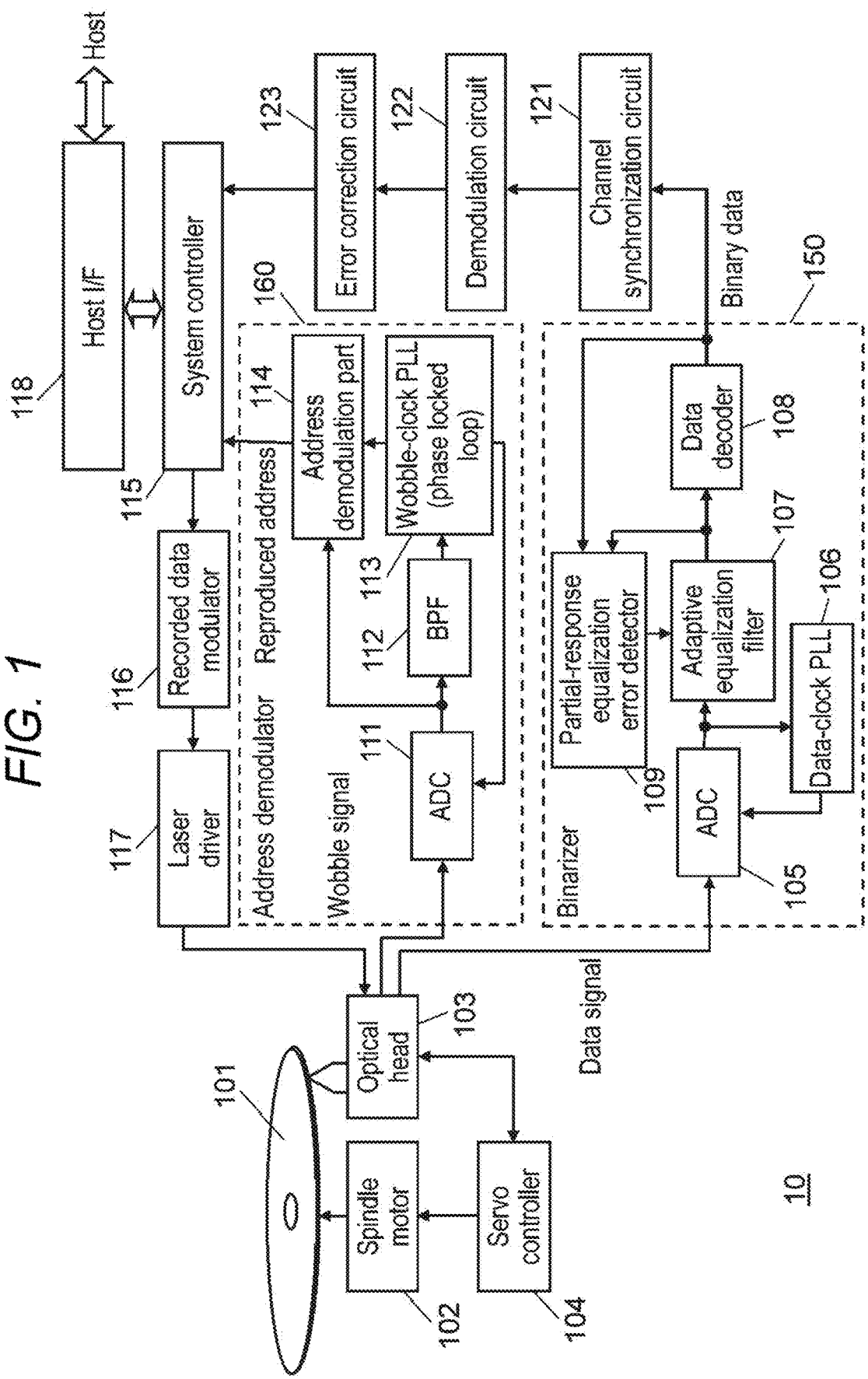
FIG. 1 shows the configuration of an information recording/reproducing device according to a first exemplary embodiment.

FIG. 1 is a diagram showing a configuration of an information recording/reproducing device of this exemplary embodiment, which records information to an optical disc and reproduces information from the optical disc.

Optical disc 101 has tracks formed into a spiral shape, in which information is recorded on the tracks. Moreover, wobbled grooves are formed on both sides of the tracks, and addresses which indicate physical positions on the optical disc are superimposed and recorded on the wobbled grooves.

Information recording/reproducing device 10 includes spindle motor 102, optical head 103, servo controller 104, binarizer 150, address demodulator 160, system controller 115, recorded data modulator 116, laser driver 117, host interface (host I/F) 118, channel synchronization circuit 121, demodulation circuit 122, and error correction circuit 123.

Optical head 103 irradiates optical disc 101 with a light beam, detects a quantity of reflected light coming from optical disc 101, and outputs a data signal corresponding to the quantity of the reflected light. Optical head 103 includes a photodetector that generates a wobble signal, the data signal and a servo error signal. Spindle motor 102 rotates optical disc 101. Based on the servo error signal, servo controller 104 controls a position where optical head 103 irradiates the track of optical disc 101 with the light beam, and controls a number of revolutions of spindle motor 102.

Binarizer 150 generates binary data from the data signal coming from optical head 103. Binarizer 150 includes ADC (analog-to-digital converter) circuit 105, data-clock PLL (phase locked loop) 106, adaptive equalization filter 107, data decoder 108, and PR (partial-response) equalization error detector 109. ADC circuit 105 is a circuit that performs, for the data signal coming from optical head 103, analog signal processing such as HPF (high-pass filter) processing for suppressing a predetermined DC (direct current) fluctuation, LPF (low-pass filter) processing for removing a high-frequency noise which is not necessary for reproducing data, and AGC (auto gain control) processing for suppressing an amplitude fluctuation of the data signal. ADC circuit 105 further performs AD conversion processing for converting an analog signal into a digital signal by using a clock signal supplied from data-clock PLL 106. From the data signal processed in ADC circuit 105, data-clock PLL 106 generates a clock signal, which is synchronized with the data signal. For example, adaptive equalization filter 107 is an FIR (finite impulse response) filter, and a coefficient of the filter is adaptively updated so that the data signal processed in ADC circuit 105 can obtain desired PR (partial-response) characteristics. Data decoder 108 decodes an output of adaptive equalization filter 107 to the binary data. As a PR system, an optimal system may be selected depending on a recording code and a recording line density. As the PR system, for example, there are a PR1221 system, and a PR12221 system. PR equalization error detector 109 generates a PR equalization error signal based on a difference between a desired PR expected value waveform, which is generated from the binary digital data of data decoder 108, and an output waveform of adaptive equalization filter 107. In adaptive equalization filter 107, the coefficient of the filter is changed so that the error signal as an output of PR equalization error detector 109 can become small.

Channel synchronization circuit 121 detects a sector synchronization signal and a frame synchronization signal from the binary data input from data decoder 108, and determines a demodulation start position per bit.

Demodulation circuit 122 demodulates the binary data in accordance with the demodulation start position determined by channel synchronization circuit 121, then generates source data bits, and outputs source data symbols, which is formed by collecting the source data bits per 8-bit unit, to error correction circuit 123.

Error correction circuit 123 corrects an error, which is included in the source data symbols, by using a long-distance code (LDC) and a picket code, which are included in the source data symbols.

Address demodulator 160 demodulates an address from the wobble signal coming from optical head 103. Address demodulator 160 includes ADC circuit 111, band-pass filter (BPF) 112, wobble-clock PLL 113, and address demodulation part 114. For the wobble signal coming from optical head 103, ADC circuit 111 performs analog signal processing such as HPF processing for suppressing a predetermined DC fluctuation, LPF processing for removing a high-frequency noise which is undesirable in reproducing the wobble signal, and AGC processing for suppressing an amplitude fluctuation of the wobble signal. Moreover, ADC circuit 111 performs AD conversion processing for converting an analog signal into a digital signal by using a clock signal supplied from wobble-clock PLL 113. Band-pass filter (BPF) 112 extracts a signal of a predetermined frequency band from the wobble signal. From the wobble signal subjected to the BPF processing, wobble-clock PLL 113 generates the clock signal synchronized with the wobble signal. Address demodulation part 114 is a circuit that demodulates address information from the wobble signal sampled while taking the clock of wobble-clock PLL 113 as a reference.

System controller 115 controls respective blocks and communicates with a host. Recorded data modulator 116 changes user data into a recorded data pattern that enables the user data to be recorded in optical disc 101. Laser driver 117 converts the recorded data pattern, which is demodulated in recorded data modulator 116, into a light pulse for accurately forming a mark on optical disc 101 as a recording medium, and then applies a laser beam. Host I/F 118 transfers, with the host, the recorded data, reproduced data and a variety of commands.

1.2 Optical Disc

Figure 2B:
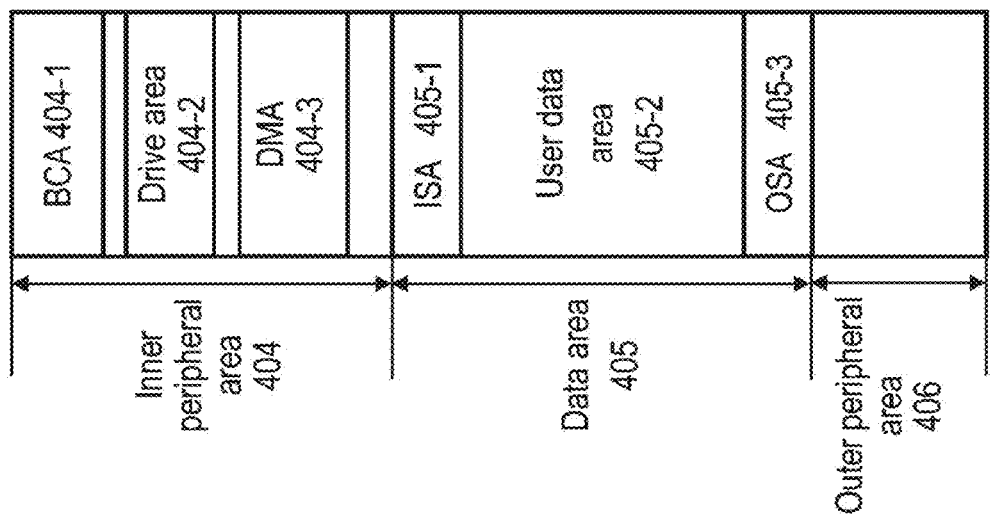
FIGS. 2A and 2B show the logical structure of an optical disc.
Figure 2A:
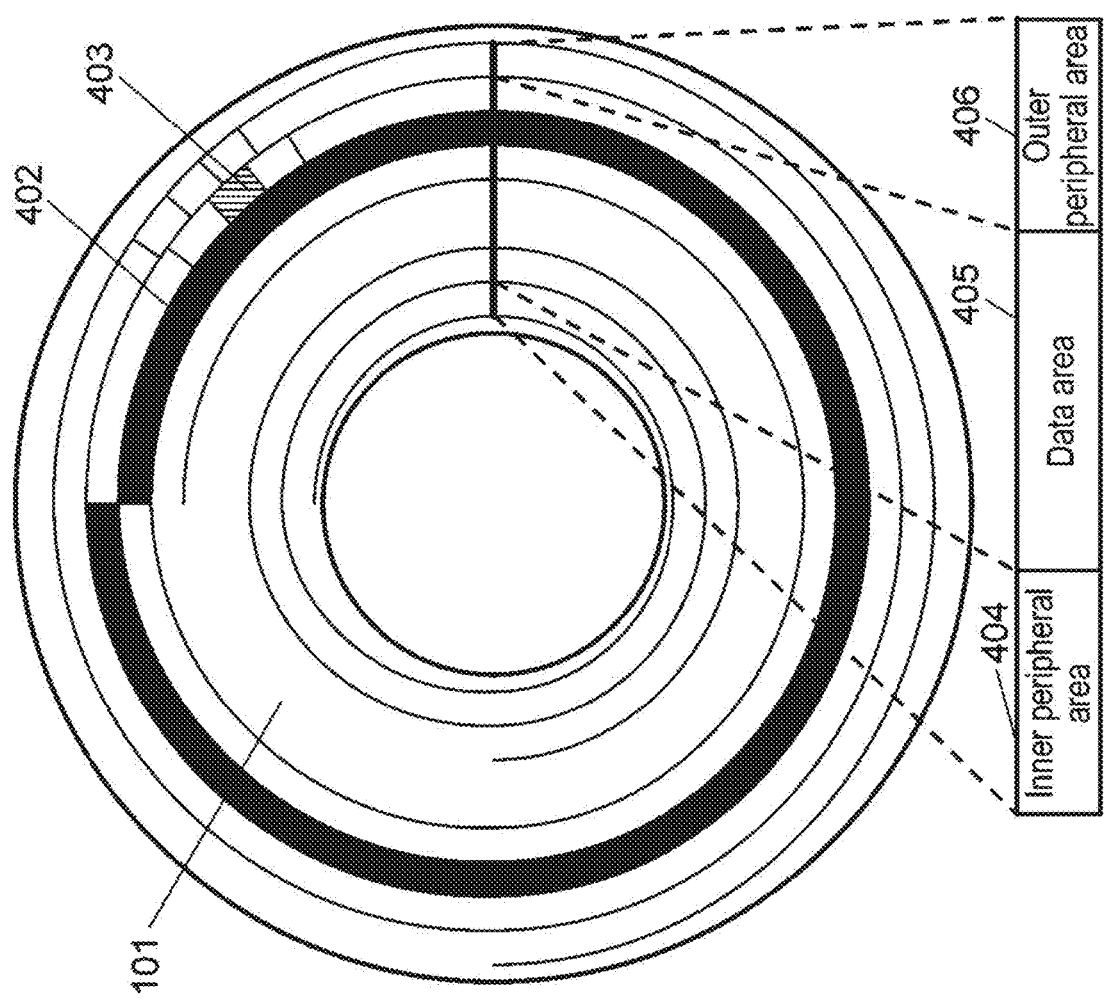

Optical disc 101 in this exemplary embodiment is a write-once recording medium. FIG. 2A is a diagram describing areas of optical disc 101 in this exemplary embodiment. Disc-like optical disc 101 includes one or more recording layers capable of recording and reproducing information. On each of the recording layers, grooves are formed in a spiral shape from a center of the recording layer concerned, and tracks 402 in each of which a recording mark is formed on any of the grooves or lands (areas between the grooves) are formed. Each of tracks 402 includes a plurality of clusters 403 finely divided. The grooves of track 402 are formed by being wobbled, and address information (hereinafter, referred to as "physical address"), which indicates a detailed position on the disc, is imparted to each of the wobbled grooves. Note that such tracks are provided on both of the groove and the land to record information therein, so that a recording density of the tracks may be enhanced.

An interval (track pitch) between tracks 402 is, for example, 0.32 μm in a Blu-ray (registered trademark) disc (BD).

Cluster 403 is a minimum data unit at which recording and reproducing operations are performed. For example, in a case of a DVD (registered trademark), a size of cluster 403 is 32 KByte, and in a case of the BD, the size of cluster 403 is 64 KByte. When cluster 403 is represented by sectors (2 KByte) that is a minimum unit of data of optical disc 101, 1 cluster is equal to 32 sectors (1 cluster=32 sectors).

Optical disc 101 includes inner peripheral area 404, data area 405, and outer peripheral area 406. FIG. 2B is a diagram showing an area structure of optical disc 101. Data area 405 includes user data area 405-2, inner spare area (ISA) 405-1, and outer spare area (OSA) 405-3. In user data area 405-2, user data is recorded. Each of inner spare area (ISA) 405-1 and outer spare area (OSA) 405-3 includes an alternate area for use in alternative recording of a defect area detected in user data area 405-2, and the like.

Each of inner peripheral area 404 and outer peripheral area 406 includes an area for recording management information necessary to perform the recording and the reproduction mainly for optical disc 101, and the like. Each of inner peripheral area 404 and outer peripheral area 406 functions as a margin area for enabling optical head 103 to follow track 402 even if optical head 103 overruns in a case where optical head 103 accesses an end of data area 405.

Inner peripheral area 404 is an area for which the recording and the reproduction are performed according to needs, and is sometimes referred to as "lead-in". Unlike user data area 405-2, inner peripheral area 404 is an area for which the user cannot directly perform the recording and the reproduction. Inner peripheral area 404 includes areas such as BCA (burst cutting area) 404-1, drive area 404-2, and DMA (defect management area) 404-3.

BCA 404-1 is a pre-recorded area formed in a bar code shape by including disc-related information and information intrinsic to each disc by using a special device at a manufacturing process of optical disc 101. For example, BCA 404-1 is an area formed by removing a reflection film by a laser beam. In BCA 404-1, for example, information such as a serial number intrinsic to each optical disc 101 is stored.

Drive area 404-2 is an area to which information recording/reproducing device 10 may freely record information necessary to control information recording/reproducing device 10 itself, and the like.

DMA 404-3 is an area capable of recording management information such as information regarding an area structure of data area 405 in optical disc 101, information regarding a defective cluster, and information indicating a recording state of optical disc 101.

Note that inner peripheral area 404 of optical disc 101 may further include areas such as an OPC (optimum power control) area for adjusting recording power of information recording/reproducing device 10 and a PreWrite area for performing tracking/focus adjustment.

2. Operations

Hereinafter, operations of information recording/reproducing device 10 will be described. Note that, in the following, optical disc 101 will be described on a premise of being a write-once Blue-ray disc, in which a unit of the recording and the reproduction is cluster (64 KB).

2.1 Recording Operation

A recording operation to optical disc 101 by information recording/reproducing device 10 will be described.

System controller 115 receives a recording command which instructs data recording, recorded data and a logical address from the host via host I/F 118, and starts the recording operation of information recording/reproducing device 10. Moreover, system controller 115 converts the logical address into a physical address on optical disc 101, controls spindle motor 102 and servo controller 104, and moves optical head 103 to a vicinity of a designated address.

Address demodulation part 114 demodulates physical address information from the wobble signal. Based on the physical address information, system controller 115 confirms a position of optical head 103, or calculates a difference of the position of optical head 103 from the designated address, and moves optical head 103 by track jumping. That is, system controller 115 causes optical head 103 to do the track jumping to an address a little forward of the designated address so as to be capable of starting the recording from the designated address, and from such a forward address, moves optical head 103 along the track to the designated address, and starts the recording.

In recorded data modulator 116, system controller 115 modulates the recorded data from the host, sets optimum recording power and recording pulse information into laser driver 117, starts the recording by emitting a laser beam from the designated address position, and executes the recording during a designated recording length.

2.2 Reproducing Operation

A reproducing operation from optical disc 101 by information recording/reproducing device 10 will be described.

System controller 115 receives a reproduction command to require data reproduction, and a logical address of the data from the host via host I/F 118, and starts the reproducing operation of information recording/reproducing device 10. System controller 115 converts the logical address into a physical address on optical disc 101, controls spindle motor 102 and servo controller 104, and moves optical head 103 to a vicinity of a designated address. Address demodulation part 114 demodulates physical address information from a wobble signal. By this address information, system controller 115 confirms the position of optical head 103. At this time, if address information superimposed on the recorded data is reproduced from data decoder 108, then the address concerned may be taken as a reference. System controller 115 calculates a difference of the position of optical head 103 from the designated address, and moves optical head 103 by the track jumping. That is, system controller 115 causes optical head 103 to do the track jumping to an address a little forward of the designated address so as to be capable of starting the reproduction from the designated address, and from such a forward address, moves optical head 103 along the track to the designated address, and starts the reproduction.

System controller 115 processes the data signal by ADC circuit 105, adaptive equalization filter 107, data decoder 108, channel synchronization circuit 121, demodulation circuit 122, and error correction circuit 123, and reproduces the data recorded in optical disc 101. The reproduced data is transferred to the host via host I/F 118.

2.3 Parity, Address Information, and Frame Synchronization Signal, which are Imparted to Recorded Data At a time of recording the data to optical disc 101, a parity, address information and a frame synchronization signal are imparted to the data to be recorded, and thereafter, the data is recorded to optical disc 101. Moreover, at a time of reproducing the data from optical disc 101, the data is reproduced from optical disc 101 by using the frame synchronization signal, the address information and the parity, which are imparted to the data.

Hereinafter, with reference to FIG. 3, a description will be made of the recording and reproduction of the data, to which the parity, the address information and the frame synchronization signal are imparted, to and from optical disc 101.

Figure 3:
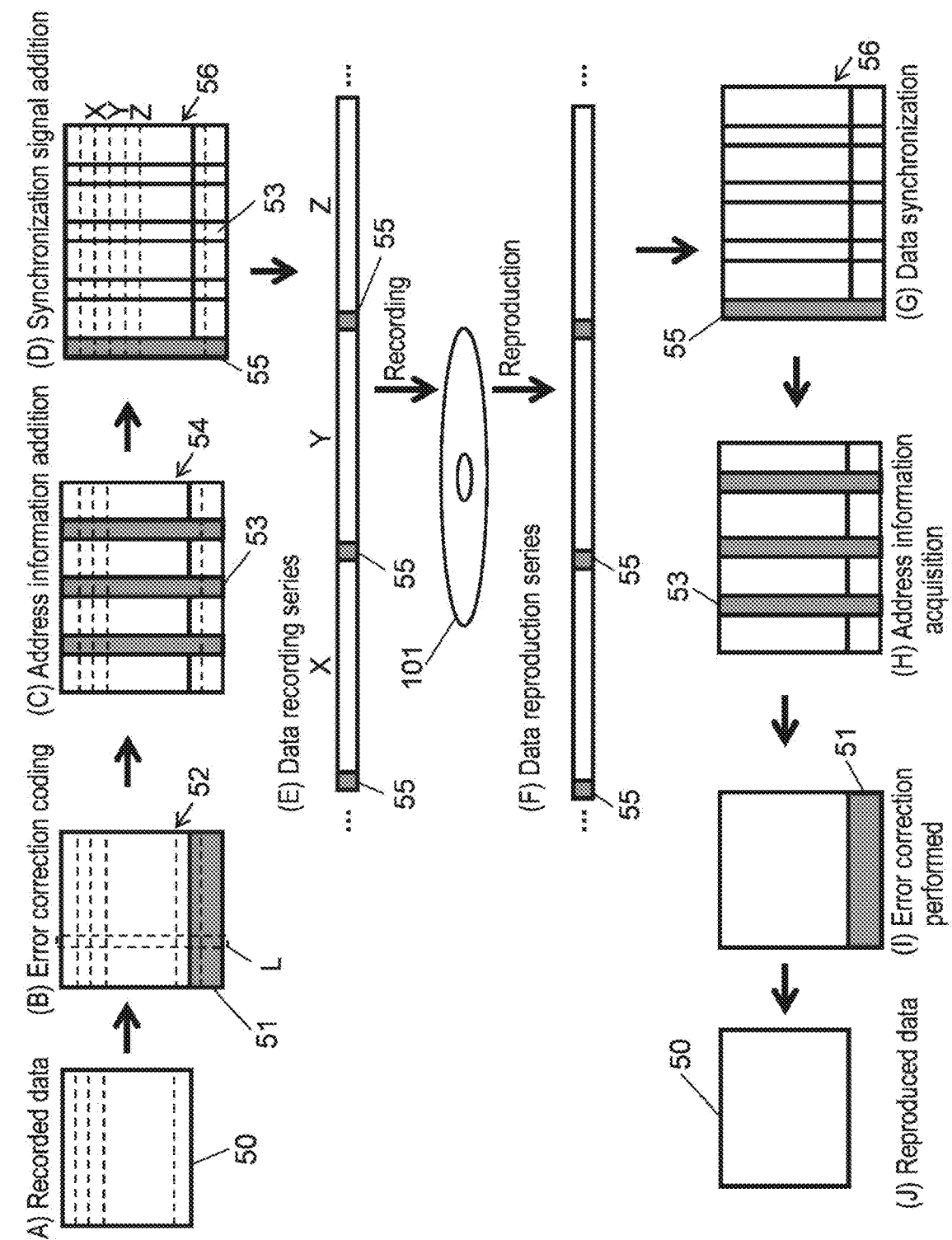
FIG. 3 illustrates recording and reproduction of data on and from the optical disc.

(A) of FIG. 3 shows user data 50 recorded to optical disc 101. User data 50 is a cluster that is a minimum data unit at which the recording and reproducing operations are performed, and user data 50 has a size of 64 KB.

At such a data recording time, first, parity 51 is imparted to user data 50, so that LDC (long-distance code) block 52, which is subjected to error correction coding, is generated (refer to (B) of FIG. 3). This parity 51 is imparted for each of vertical data symbols of user data 50 in order to correct an error that occurs in the vertical data symbols, and configures an LDC codeword L. Moreover, in LDC block 52, three columns of picket codes 53 including the address information are inserted (refer to (C) of FIG. 3). Block 54 generated by inserting picket codes 53 into LDC block 52 will be hereinafter referred to as "LDCA block". Thereafter, frame synchronization signal 55 is further imparted to LDCA block 54 (refer to (D) of FIG. 3). Block 56 newly generated by being imparted to frame synchronization signal 55 will be referred to as "LDCAS block".

As described above, parity 51, picket codes 53 and frame synchronization signal 55 are imparted to user data 50 recorded to optical disc 101, and thereafter, Run-in is further imparted to a head of LDCAS block 56, and Run-out is further imparted to an end of LDCAS block 56. Note that, in FIG. 3, Run-in and Run-out are not shown for simplifying the description. (E) of FIG. 3 is a diagram showing a time series of the recorded data shown in (D) of FIG. 3. Thereafter, information recording/reproducing device 10 records such LDCAS blocks 56, to each of which Run-in and Run-out are imparted, in the track of optical disc 101 for each of rows.

Meanwhile, in a case of reproducing the data from optical disc 101, information recording/reproducing device 10 reads out signals from the track of optical disc 101. (F) of FIG. 3 is a diagram showing the signals, which are read out from optical disc 101, in a time series. Information recording/reproducing device 10 detects such frame synchronization signals 55, recognizes recording start positions of frames, sequentially reads out the data, and disposes the read-out data as shown in (G) of FIG. 3. Thereafter, information recording/reproducing device 10 detects and removes frame synchronization signal 55 and picket codes 53 in LDCAS block 56 (refer to (H) and (I) of FIG. 3), and further, performs error correction by using parity 51, and obtains correct user data 50 without an error (refer to (J) of FIG. 3).

2.4 Erasing of Data

Information recording/reproducing device 10 of this exemplary embodiment has a function to erase the data recorded in write-once optical disc 101. Specifically, in optical disc 101, the data to be erased is overwritten by an erasing pattern, so that the data is made non-reproducible, thus erasing of the data is realized. The erasing pattern is a recorded pattern, which is recorded in optical disc 101 in order to corrupt specific data in the LDCAS block. Here, concretely, the specific data is information necessary to reproduce and synchronize the data to be erased. The data as described above is corrupted, so that the data is made non-reproducible, and an effect similar to that of the erasing of the data can be obtained. Moreover, the specific data is a part of the LDC block. That is, a part of the LDC block is corrupted so that the error correction of the data can be made impossible, and the error correction is made impossible, the data reproduction is made impossible, and thus the erasing of the data is realized. Specifically, in order to erase the data, information recording/reproducing device 10 of this exemplary embodiment corrupts the following specific data for the data recorded in optical disc 101.

1) Synchronization signal for data-clock PLL in Run-in
2) Address information
3) Frame synchronization signal and cluster synchronization signal
4) Part of LDC block (portion in which LDC codeword is recorded)

The corruption of the above-described specific data is performed by changing a recording mark, which configures the specific data, to a longer recording mark by the overwriting of the erasing pattern. The specific data is corrupted, so that the synchronization detection, the detection of the address information and the error correction become impossible. In this way, it becomes impossible to reproduce the data, and as a result, such an effect similar to that of the erasing of the data is realized. Note that it is not necessary to corrupt all of the above-described specific data of 1) to 4), and at least one of the above-described specific data of 1) to 4) may be corrupted as long as it becomes impossible to reproduce the data.

For example, the recorded pattern (9 T mark 9 T space or 9 T space 9 T mark) that configures the frame synchronization signal is changed to a longer mark (24 T). In this way, the operation of channel synchronization circuit 121 is inhibited, and a reproduction error can be generated.

That is, if a mark length of the recording mark included in the frame synchronization signal becomes longer than an original length, then channel synchronization circuit 121 cannot detect the frame synchronization signal from the binary data, and becomes incapable of determining the demodulation start position in the bit unit. If channel synchronization circuit 121 cannot determine the demodulation start position in the bit unit, then demodulation circuit 122 cannot generate correct source data bits and source data symbols. As a result, it becomes impossible to correctly reproduce the data recorded in optical disc 101.

Note that, in a portion in the LDCAS block, in which all the frame synchronization signals are recorded, a recording mark (for example, 24 T) longer than the mark length of the recording mark included in the frame synchronization signal may be formed.

Moreover, such errors are generated intensively on a part of the LDC block, that is, on a specific LDC codeword (vertical data symbols L of LDC block 52), thus the error correction is made impossible, and it can be made impossible to normally reproduce the data.

A number of symbols correctable by one LDC codeword is at most 32 symbols even if an erasure is taken into account. That is, if errors of 33 symbols or more are generated in one LDC codeword, then it becomes impossible to normally correct the errors. Hence, in one LDC codeword, the data is corrupted for 33 or more symbols. In this way, error correction circuit 123 senses that the correction is impossible, and generates a reproduction error. Note that, in order to generate an error in a specific symbol, a position at which the symbol is recorded just needs to be overwritten by a long mark (for example, 12 T) that is not present in a modulation rule. Note that the data symbols which corrupt the data are not limited to the vertical data symbols. Corrupting an arbitrary data symbols, which are disposed in a direction where the error correction coding is performed, prevents error correction.

Figure 4:
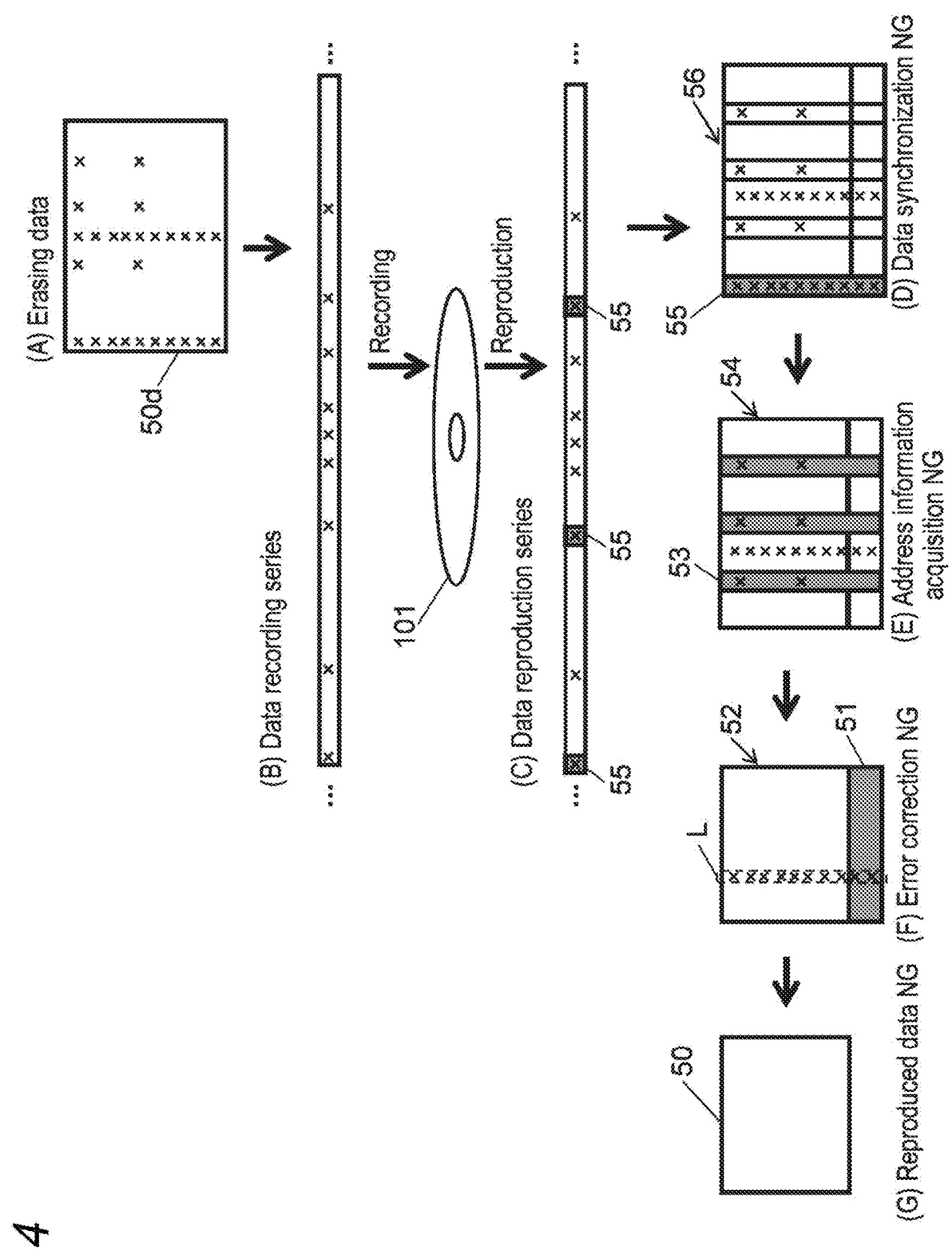
FIG. 4 illustrates how to erase data recorded on an optical disc and why erased data cannot be reproduced.

With reference to FIG. 4, a description will be made of the erasing of the data in optical disc 101. (A) of FIG. 4 shows erasing pattern 50d by which cluster data to be erased is overwritten. "x" shown in (A) of FIG. 4 indicates mark forming positions for corrupting the above-described specific data of 1) to 4). (B) of FIG. 4 is a diagram showing erasing pattern 50d arrayed in time series, erasing pattern 50d being shown in (A) of FIG. 4. In optical disc 101, when the data to be erased is overwritten by erasing pattern 50d shown in (A) of FIG. 4, then as shown in (C) of FIG. 4, the data is corrupted in frame synchronization signals 55, picket codes 53 and a part of the user data (refer to (C) of FIG. 4). Moreover, though not shown, a data-clock PLL synchronizing signal in Run-in and the sector synchronization signal are also corrupted.

Therefore, in a case of attempting to reproduce the data from such an area of optical disc 101, from which the data is erased, then first, since the data-clock PLL synchronizing signal in Run-in is corrupted, the PLL synchronization cannot be achieved, and the reproduction error is generated. Even if the reproduction error due to the PLL synchronization is not generated, since the sector synchronization signal and frame synchronization signals 55 are corrupted, the frame synchronization cannot be achieved, and the reproduction error is generated (ref to (D) of FIG. 4). Moreover, even if the reproduction error due to the frame synchronization is not generated, since the address information cannot be acquired because the address information is corrupted, the reproduction error is generated (refer to (E) of FIG. 4). Moreover, even if the address information can be acquired, since a part (LDC codeword) L of the LDC block is corrupted to an extent where the error correction cannot be performed, such an error generated in a part (that is, user data 50 of the LDC block) cannot be corrected, and the reproduction error is generated (refer to (F) of FIG. 4). Moreover, even if the reproduction error is not generated in the error correction, since user data 50, which is read out, is not still subjected to the error correction, user data 50 becomes different data from the original data, and security is ensured.

As described above, in the cluster data, the data necessary for the reproduction synchronization and the error correction, the data including the address information, the frame synchronization signal and a part of the user data, is corrupted, so that there is obtained an effect similar to that of the erasing of the data, which can surely make the user data non-reproducible. Moreover, the overwriting is performed in such an area where an amount of the cluster data is small, and accordingly, an amount of recording marks which are newly recorded can be reduced. Hence, a fluctuation of an area ratio (50:50) of the recording marks and the space in the recording layer can be suppressed, and it becomes possible to erase (invalidate) the data without affecting the servo control.

Figure 5:
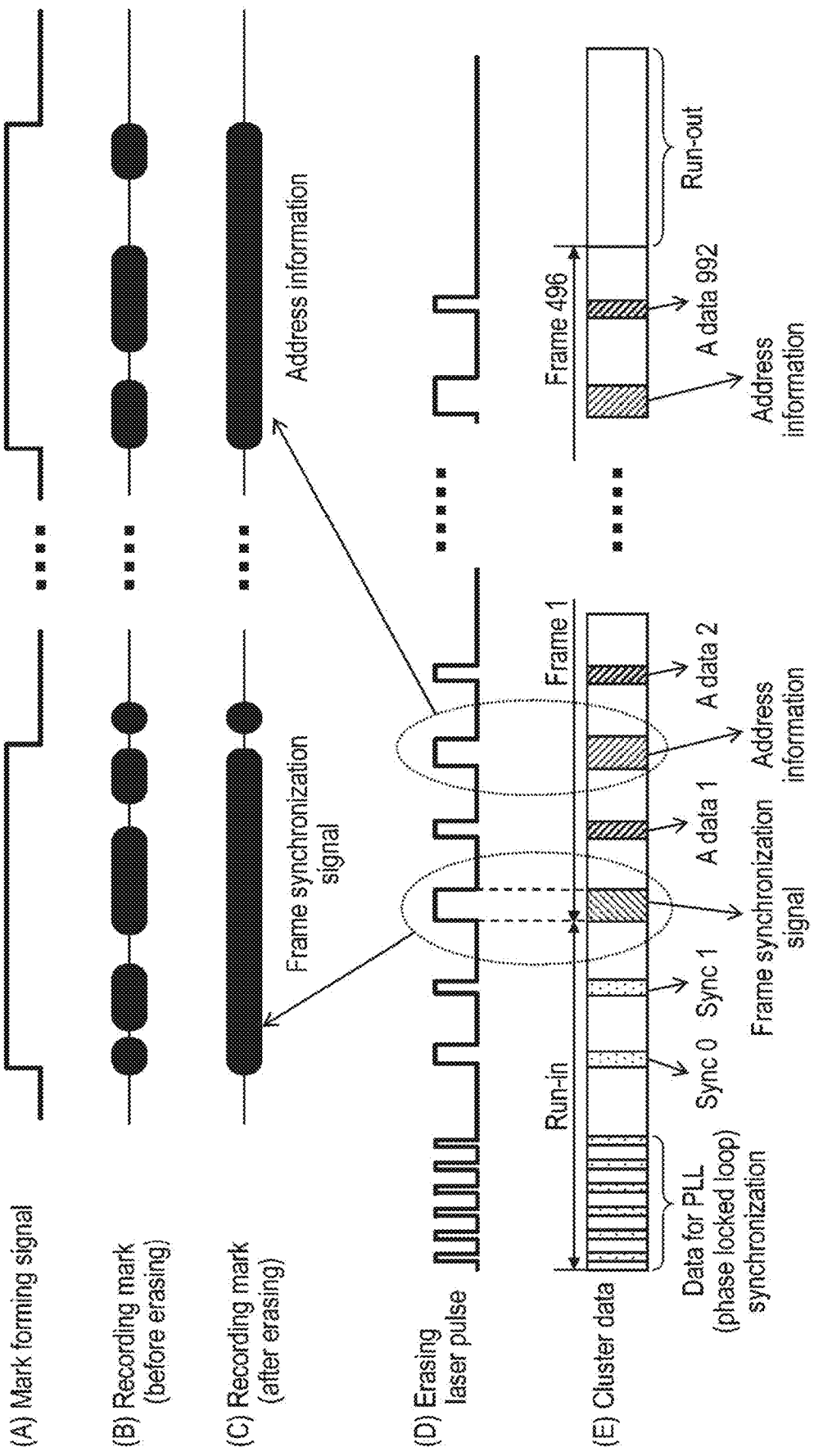
FIG. 5 illustrates how to erase cluster data.
Figure 6:
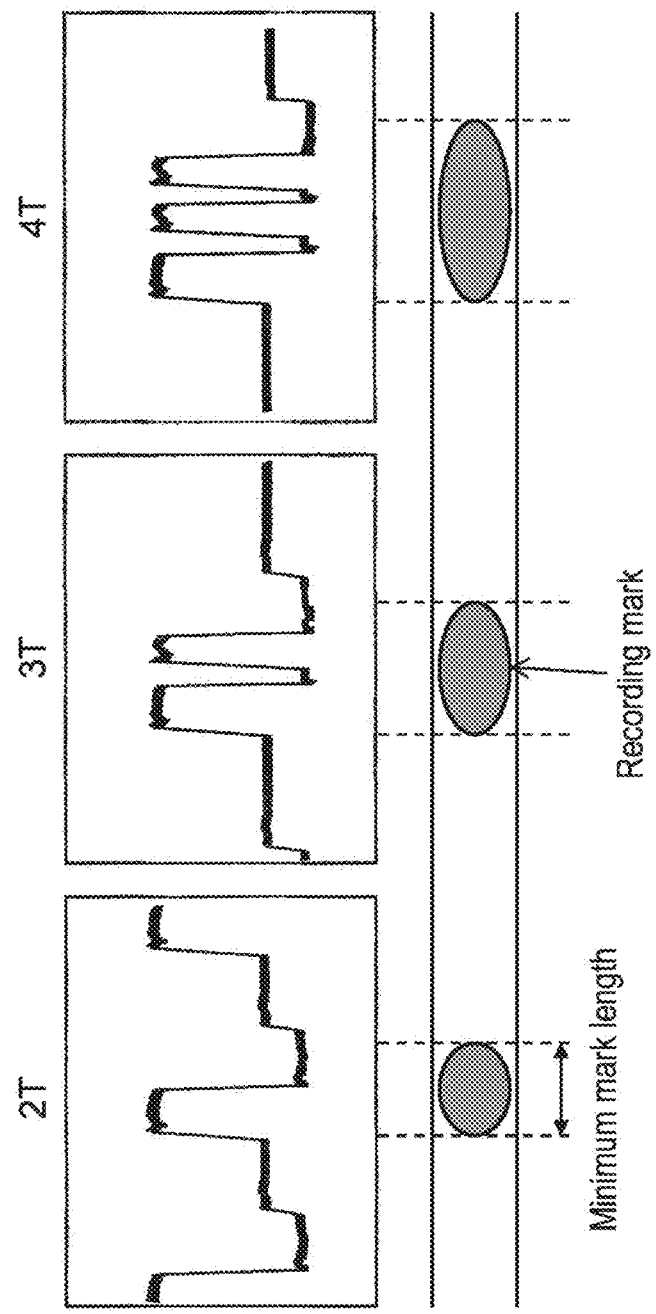
FIG. 6 shows recording waveforms and recording marks formed on a track.

FIG. 5 is a diagram for describing the corruption of the specific data in the cluster data, the corruption serving for the erasing of the data. (A) of FIG. 5 shows a recording mark forming signal. When the recording mark forming signal is "High", a recording mark forming operation is performed. (B) of FIG. 5 is a diagram showing a recorded state of the recording marks before the erasing. (C) of FIG. 5 is a diagram showing a recorded state of the recording marks after the erasing. (D) of FIG. 5 is a diagram showing a waveform of an erasing laser pulse. (E) of FIG. 5 is a diagram showing a structure of the cluster data. Note that, in actual, an erasing laser pulse with a waveform as shown in FIG. 6 is applied in order to form the recording marks, however, in FIG. 5, the pulse waveform is simplified and shown for the purpose of simplifying the description.

As shown in (D) of FIG. 5, the synchronization signal for data-clock PLL in Run-in and cluster synchronization signals SYNC 0, SYNC 1 are corrupted. Moreover, the frame synchronization signal, the address information and a part of the user data are corrupted.

The corruption of these specific data is performed by the overwriting by the erasing pattern. That is, the corruption is performed by forming the recording marks in spaces where the recording marks which configure the specific data to be corrupted are not recorded.

For example, (B) of FIG. 5 shows the recording marks before the erasing, the recording marks being formed as the frame synchronization signal. In a case of corrupting this frame synchronization signal, then as shown in (C) of FIG. 5, recording marks are formed in the areas where the recording marks are not formed, so that a longer recording mark is formed. In this way, a pattern different from the pattern that indicates the original frame synchronization signal is formed.

The frame synchronization signal is overwritten and corrupted in the method as described above, thus corrupted binary data corresponding to the frame synchronization signal is read out from the area of the corrupted frame synchronization signal. Accordingly, it becomes difficult or impossible for channel synchronization circuit 121 to detect the frame synchronization signal, and it becomes difficult or impossible for channel synchronization circuit 121 to specify the start position of the frame.

A data 1, A data 2 to A data 992 of (E) of FIG. 5 show a partial spot of the LDC block to be corrupted. For example, this spot is overwritten by a length of a 12 T mark that is not present in the user data. In this example, an overwriting position is determined so that four LDC codewords can be corrupted at a 992 overwrite spot.

Figure 7:
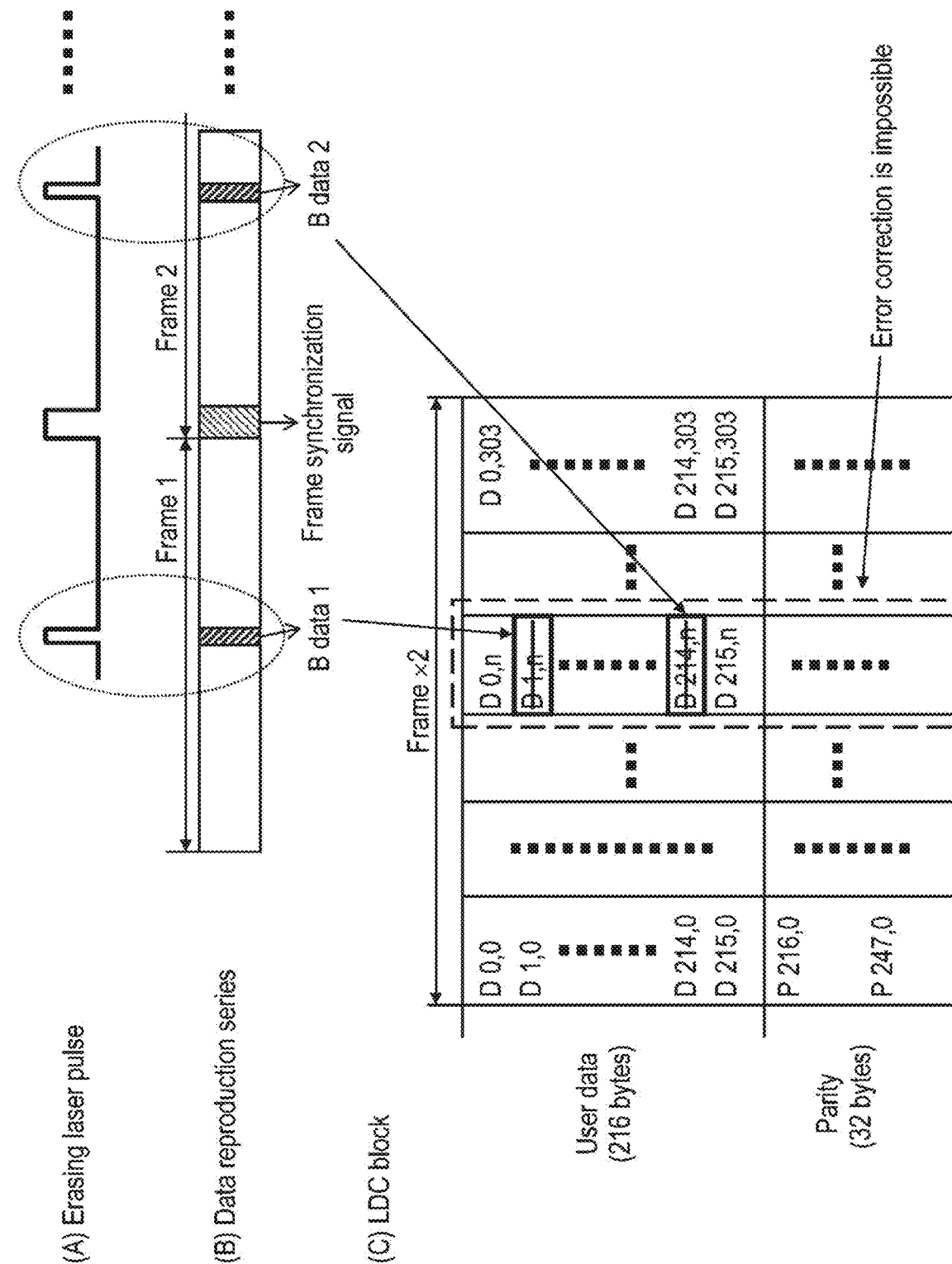
FIG. 7 illustrates how to erase particular data of cluster data.

FIG. 7 is a diagram describing the corruption of a part of the data in the LDC block. Corrupting the data of one vertical line (LDC codeword) in the LDC block, to an extent where the error correction fails, makes the error correction using parity unavailable (refer to (C) of FIG. 7). B data 1, B data 2 of (B) of FIG. 7 show a partial spot of the LDC block to be corrupted. For example, in the LDC block, the LDC codewords of 1 to 4 just need to be corrupted. The present disclosure is not limited to this example, and a number of LDCs to be corrupted just needs to be determined in consideration of the stability of the servo.

Figure 8:
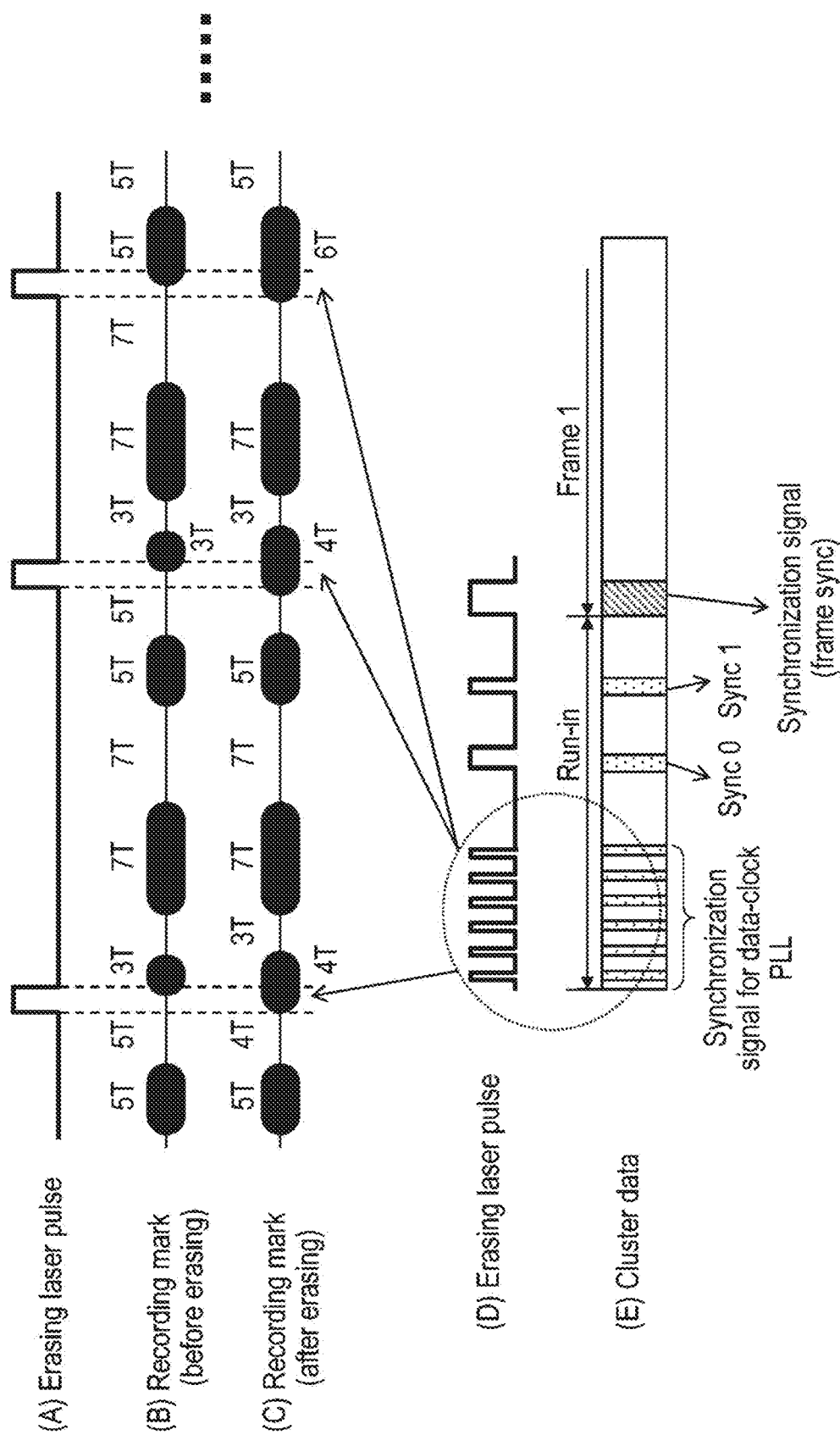
FIG. 8 illustrates how to erase cluster data by erasing PLL synchronizing data.

FIG. 8 is a diagram describing the corruption of the synchronization signal for the data-clock PLL in Run-in, the corruption serving for the data erasing. The recording marks which configure the synchronization signal for the data-clock PLL are changed from 3 T marks (refer to (B) of FIG. 8) to 4 T marks (refer to (C) of FIG. 8). In this way, the synchronization pattern is changed from "553377" to "544377". Therefore, a signal read out from this area becomes unrecognizable as the synchronization signal for the data-clock PLL, and it becomes difficult or impossible to perform the PLL synchronization.

Note that, in Run-in, in addition to the synchronization signal for the data-clock PLL, the cluster synchronization signals SYNC 0, SYNC 1 for use in specifying the start position of the cluster are also corrupted.

As described above, in this exemplary embodiment, in the cluster data to be erased, only a specific part of the area (a partial area of Run-in, area of the frame synchronization signal, area of the address information, a part of the user data area) is corrupted by the overwriting. Only a small area is overwritten as described above, so that the amount of the recording marks to be added can be suppressed to a small amount, and accordingly, the servo control can be suppressed from being destabilized. Moreover, since the data necessary to reproduce the synchronization, the error correction and the like is corrupted, it can be made more difficult to reproduce the data, and the erasing of the data, which has high reliability, can be realized.

2.4.1 Erasing Control Operation 1

Figure 9:
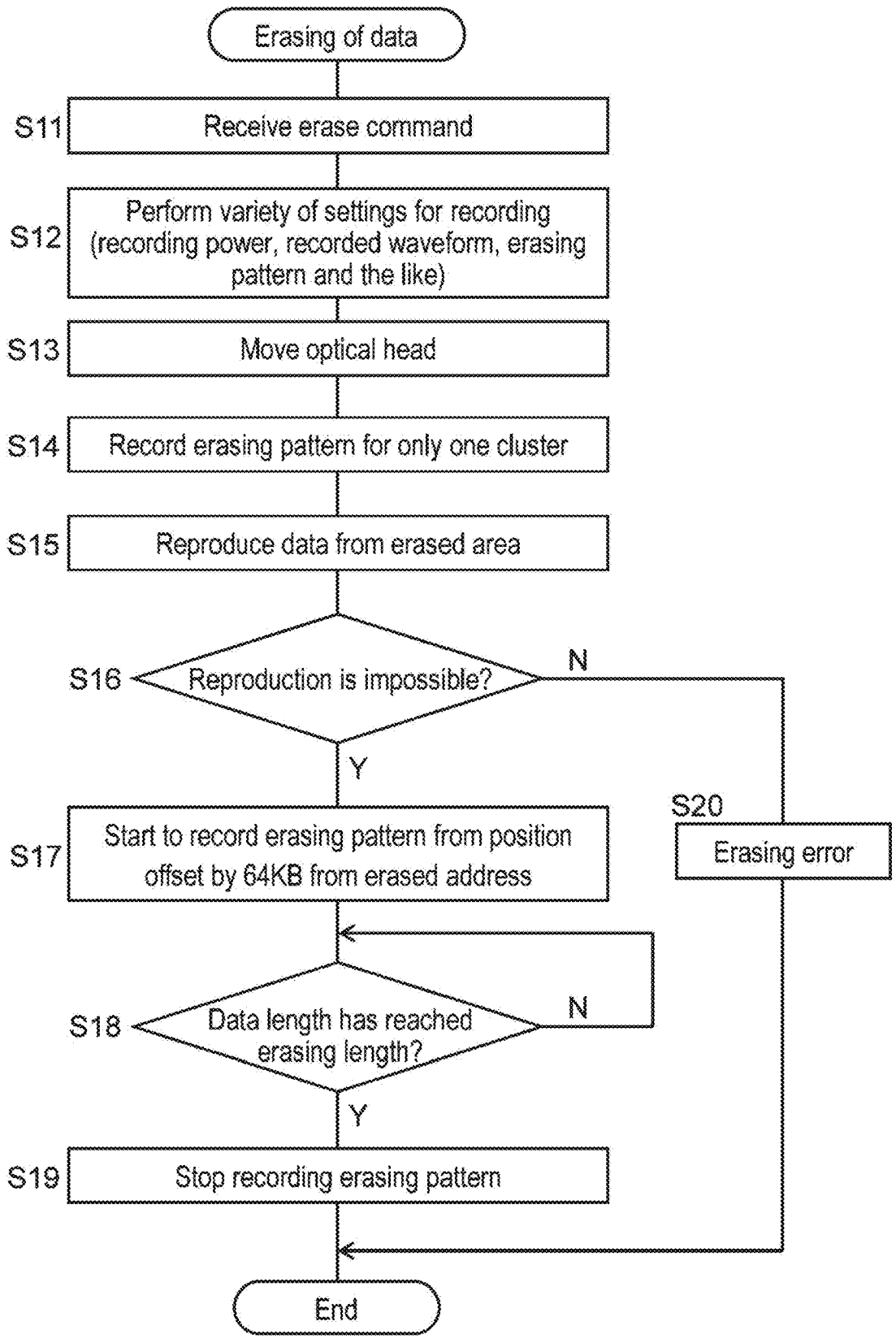
FIG. 9 is a flowchart showing a data erasing operation (data is erased units of 64 KB).

With reference to FIG. 9, FIG. 10A to FIG. 10E, a description will be made of a data erasing control operation in information recording/reproducing device 10 of this exemplary embodiment. FIG. 9 is a flowchart showing erasing operations of the data in information recording/reproducing device 10. FIG. 10A to FIG. 10E are diagrams schematically showing such a data erasing operation. This erasing control is a control in a case where the data is erased in the unit of the size (64 KB in this example) of the cluster, the unit being a unit of the recording and the reproduction. Hereinafter, an operation in a case of erasing data of 640 KB will be described.

System controller 115 receives an erase command from the host via host interface 118 (S11). At this time, an address (erase starting address), which indicates an erase start position, and a data length of the data to be erased are designated.

System controller 115 performs a variety of settings for the erasing (S12). For example, recording power, a recorded waveform, an erasing pattern and the like, which serve for causing the erasing pattern to do the overwriting.

System controller 115 moves optical head 103 to a position before a position indicated by the erase starting address (refer to FIG. 10A), and thereafter, starts to detect the address while moving optical head 103 (S13). This address is detected from the wobble of the groove.

Figure 10A:
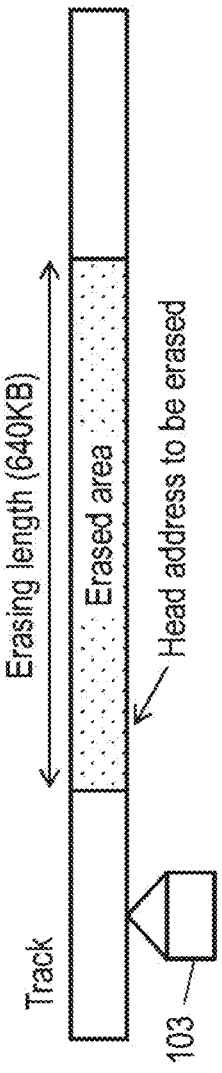
FIGS. 10A to 10E illustrate a data erasing control (data is erased is erased in units of 64 KB).
Figure 10B:
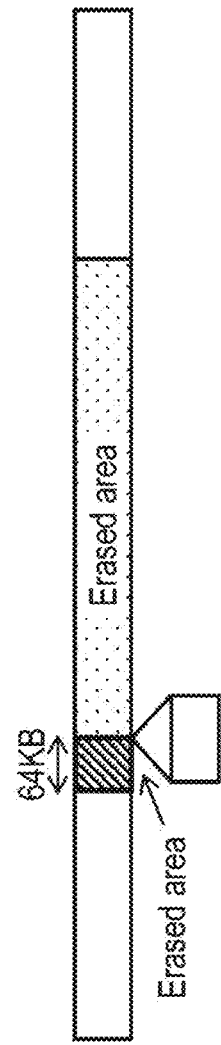

When optical head 103 reaches the position of the erase starting address, then the overwriting by the erasing pattern is started, and first, only one cluster of the data is erased (S14) (refer to FIG. 10B).

Figure 10C:
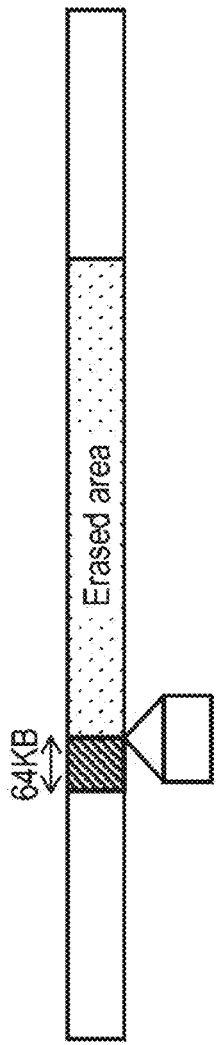
Figure 10D:
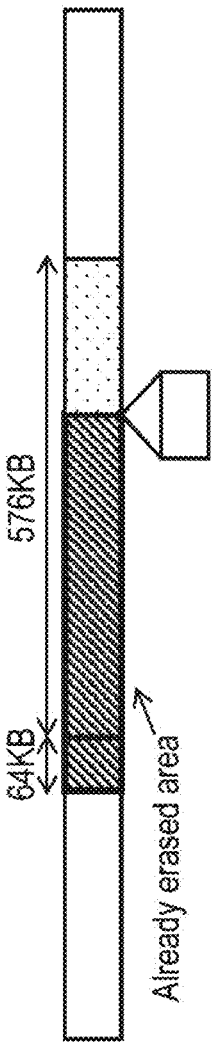
Figure 10E:
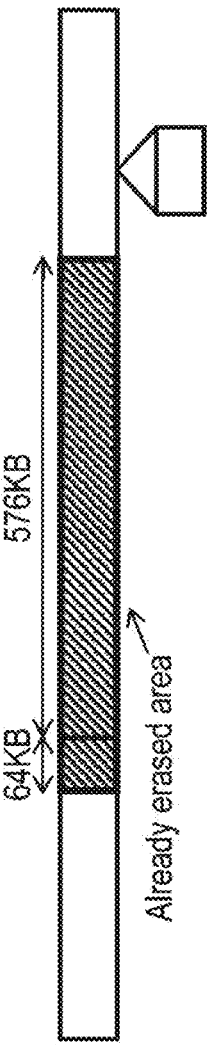

Next, the data of one cluster is reproduced from the area overwritten by the erasing pattern, thus the erasing processing is verified (S15) (refer to FIG. 10C). In a case where the data is reproducible (NO in S16), this case is regarded as an erasing error, and error processing is performed (S20).

In a case where the data is non-reproducible (YES in S16), this case means that the erasing succeeded, and accordingly, the erasing processing is performed for the rest of data. That is, the overwriting by the erasing pattern is started from a position offset by one cluster (64 KB) from the erase starting address (S17). Thereafter, the erasing of the data is continued until data with a designated data length is erased (S18) (refer to FIG. 10D). When the data with designated data length is erased (refer to FIG. 10E), the overwriting by the erasing pattern is stopped (S19). Note that, in a case where the size of the data to be erased is just one cluster (64 KB in this example), then there are no second cluster and after, and accordingly, Steps S17, S18 are skipped, and the overwriting by the erasing pattern is stopped (S19).

As described above, in this exemplary embodiment, it is verified whether or not only the data of the first one cluster can be normally erased when the data of the first one cluster is erased, and the rest of data is erased only in a case where it can be confirmed that the data of the first one cluster can be normally erased.

2.4.2 Erasing Control Operation 2

With reference to FIG. 11, FIG. 12A to FIG. 12D, a description will be made of another example of the data erasing control operation in information recording/reproducing device 10. Hereinafter, a description will be made of a data erasing control operation in a case where the size of the data to be erased is less than the size (64 KB in this example) of the cluster, which is the unit of the recording and the reproduction.

Figure 11:
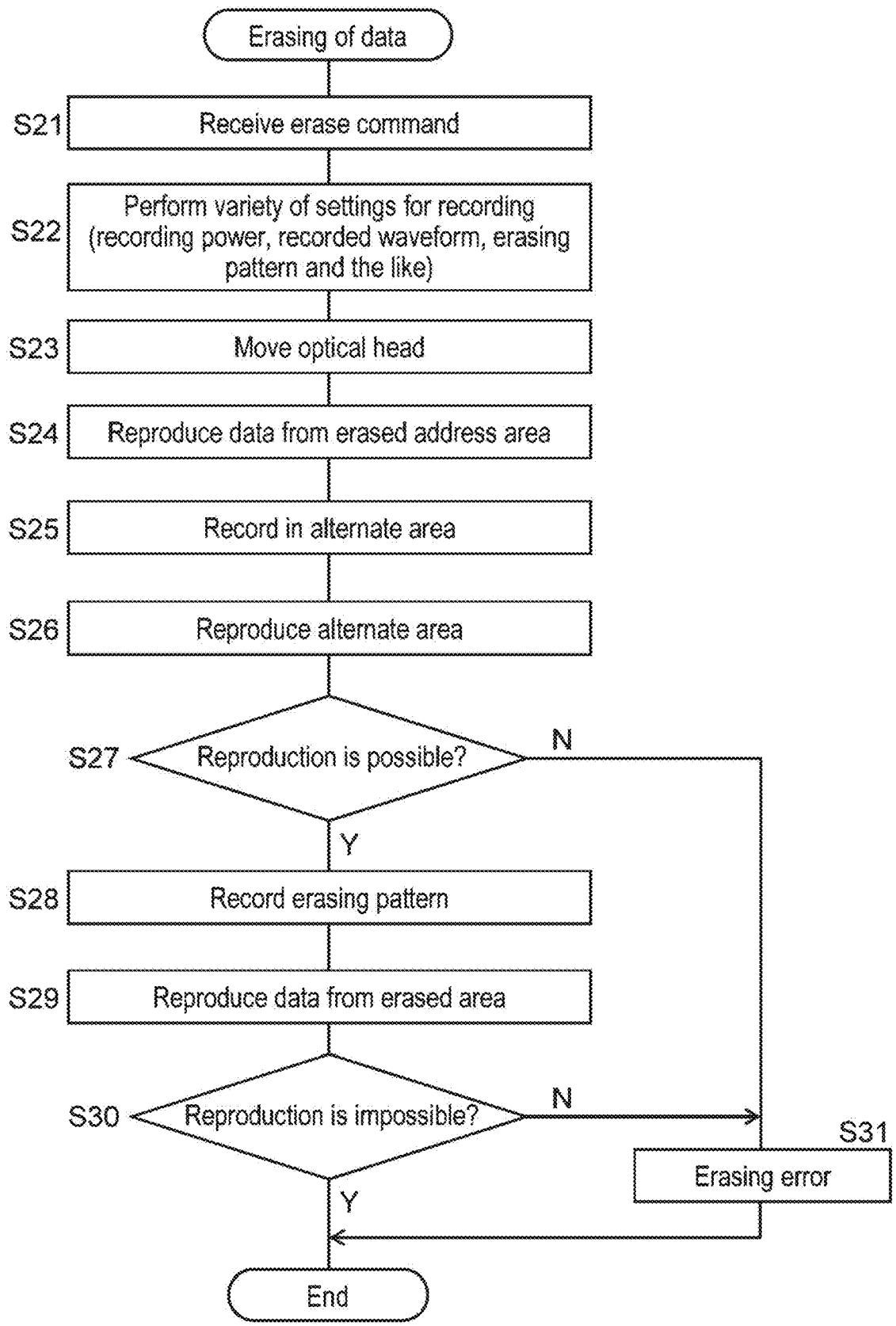
FIG. 11 is a flowchart showing another data erasing operation (data is erased units of less than 64 KB).

For convenience of the description, the erasing data size is 32 KB in the following description. FIG. 11 is a flowchart showing the erasing control operation for the data in the case where the size of the data to be erased is less than 64 KB. FIG. 12A to FIG. 12D are diagrams schematically describing the erasing operation for the data in the case where the size of the data to be erased is 32 KB.

System controller 115 receives the erase command, in which an erase starting address and a data length of the data to be erased is designated, from the host via host interface 118 (S21). Here, in the erase command, 32 KB is designated as the data length of the data to be erased.

System controller 115 performs a variety of settings for the erasing, such as the recording power and the recorded waveform (S22).

System controller 115 moves optical head 103 to the position before the position indicated by the erase starting address (refer to FIG. 12A), and thereafter, starts to detect the address while moving optical head 103 (S23).

Figure 12A:
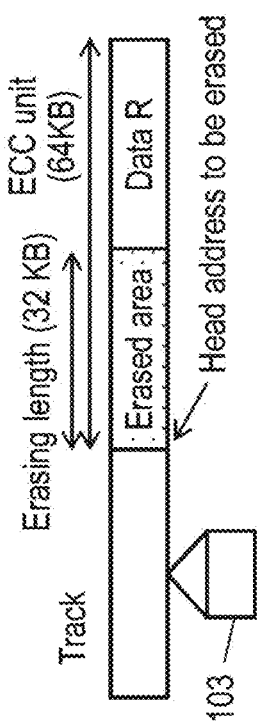
FIGS. 12A to 12D illustrate another data erasing control (data is erased units of less than 64 KB).
Figure 12B:
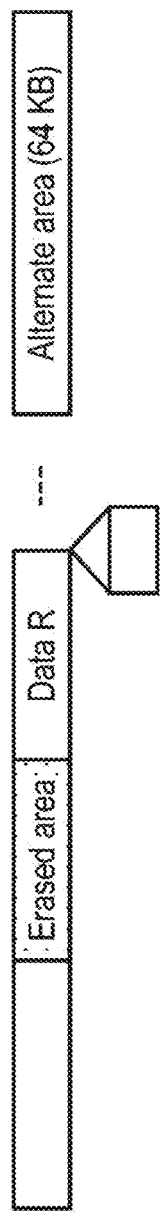

When optical head 103 reaches the position of the erase starting address, the data equivalent to one cluster (64 KB) is read out from that point (S24) (refer to FIG. 12B).

Figure 12C:
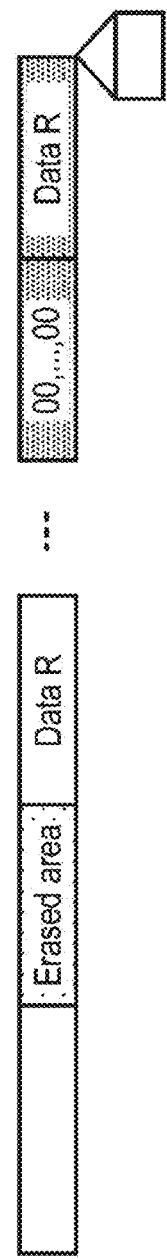

Next, in the read-out data equivalent to one cluster, data in an area corresponding to the area to be erased (32 KB) is replaced by "00" that indicates invalid data, and the replaced data is recorded in the alternate area (area of 64 KB) (S25) (refer to FIG. 12C). The alternate area is provided in inner spare area (ISA) 405-1 or outer spare area (OSA) 405-3 (refer to FIG. 2B). Moreover, correspondence between data area 405 and the alternate area is managed by the management information recorded in DMA 404-3.

Next, the data is reproduced from the alternate area in which the data is recorded in Step S25 (S26). In a case where the data is non-reproducible (NO in S27), this case is regarded as an erasing error, and error processing is performed (S31).

Figure 12D:
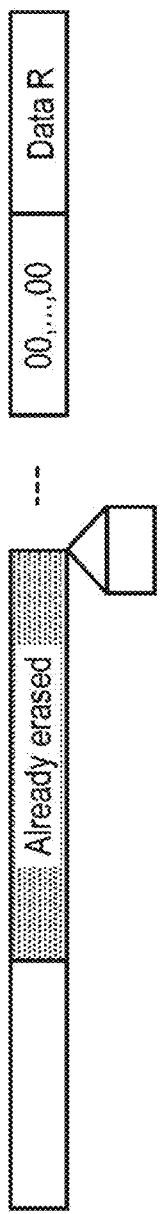

Meanwhile, in a case where the data is reproducible (YES in S27), one cluster is overwritten from the erase starting address by the erasing pattern (S28) (refer to FIG. 12D).

Next, the data equivalent to one cluster is reproduced from the area overwritten by the erasing pattern (S29) (refer to FIG. 10C).

In a case where the data is non-reproducible (YES in S30), this case means that the erasing succeeded, and accordingly, the processing is ended. Meanwhile, in a case where the data is reproducible (NO in S30), this case means that the erasing has failed, and accordingly, this case is regarded as an erasing error, and the error processing is performed (S31).

As described above, in this exemplary embodiment, in a case of erasing the data with a size smaller than the size of the cluster, which is the unit of the recording and the reproduction, then in the data area, the area with the cluster size is overwritten by the erasing pattern, and in addition, the data that is not to be erased is recorded in the alternate area. In this way, it is made possible to erase the data in a part of the cluster. As described above, it is made possible to also erase the data with a size smaller than the cluster size, and accordingly, it becomes possible to erase data in a file with an arbitrary size.

2.5 Error Correction

Error correction will be described. Binarizer 150 outputs a binary data sequence that expresses, by "0" and "1", the marks recorded in optical disc 101 and the information from the space portions. Channel synchronization circuit 121 detects the frame synchronization signal from the binary data sequence input from binarizer 150, and determines the demodulation start position per bit. Demodulation circuit 122 demodulates the binary data sequence, which is input from channel synchronization circuit 121, in accordance with the demodulation start position determined by channel synchronization circuit 121, and generates the source data bits. Moreover, demodulation circuit 122 outputs the source data symbols, in which the generated source data bits are collected per 8 bits, to error correction circuit 123. Error correction circuit 123 performs the error correction by the picket code and the LDC, which are included in the source data symbols.

Here, the picket code is configured of 24 pieces of Reed-Solomon codes as (62, 30, 33). The picket code can be used as a burst indicator. For example, in a case where errors are detected in adjacent symbols of picket codes in a recording direction, then a symbol of an LDC block sandwiched between these two symbols can be handled as an erasure, and a number of symbols correctable by the LDC can be increased. The LDC block is configured of 304 pieces of the LDCs which are Reed-Solomon codes as (248, 216, 33). Each of the LDCs can correct errors of at most 16 symbols per codeword. Moreover, if the LDC is combined with the erasure made by the picket codes, then the LDC can correct errors of at most 32 symbols per codeword.

Note that, in this exemplary embodiment, with regard to the picket codes in the erasing of the data, portions of the picket codes other than the address information are prevented from being overwritten (corrupted). This is for avoiding a stronger error correction function, triggered by error detection which occurs in picket code.

3. Effects and the Like

As described above, in accordance with this exemplary embodiment, information recording/reproducing device 10 includes host interface 118, optical head 103, and system controller 115. Host interface 118 receives the erase command in which the erase start position and size of the data to be erased are designated. Optical head 103 forms the recording marks to optical disc 101. System controller 115 controls the formation of the recording marks to optical disc 101. Upon receiving the erase command, system controller 115 erases data of an erased area by overwriting data in an information area, to corrupt the data in the information area, with the erasing pattern. The information area includes information (address information, frame synchronization signal, and the like) necessary for the synchronization of reproducing the data. The erased area is specified by the erase start position and the size of the data to be erased. In this way, information recording/reproducing device 10 erases the data in the erased area.

As described above, the data (for example, the frame synchronization signal and the address information) of the area in which the information necessary for the synchronization at the time of reproducing the recorded data is corrupted, thus the synchronization becomes impossible at the time of reproducing the data, and the data reproduction becomes impossible. Hence, similar effects to those in the case of erasing the data are obtained. Moreover, the data can be erased by only corrupting a part of the data, accordingly, the area to be overwritten by the erasing pattern can be reduced (the fluctuation of the area rate between the recording marks and the spaces can be reduced). Hence, the degradation of the quality of the servo signal can be prevented, and the stability of the servo control can be ensured. Moreover, the data necessary for the synchronization at the time of reproducing the data is corrupted, and accordingly, it can be made surely impossible to reproduce the data, and the data can be surely erased.

Second Exemplary Embodiment

The configuration and operation of a second exemplary embodiment will be described below. Descriptions for what are the same as in the first exemplary embodiment will be omitted, that is, only differences will be described below.

Figure 13:
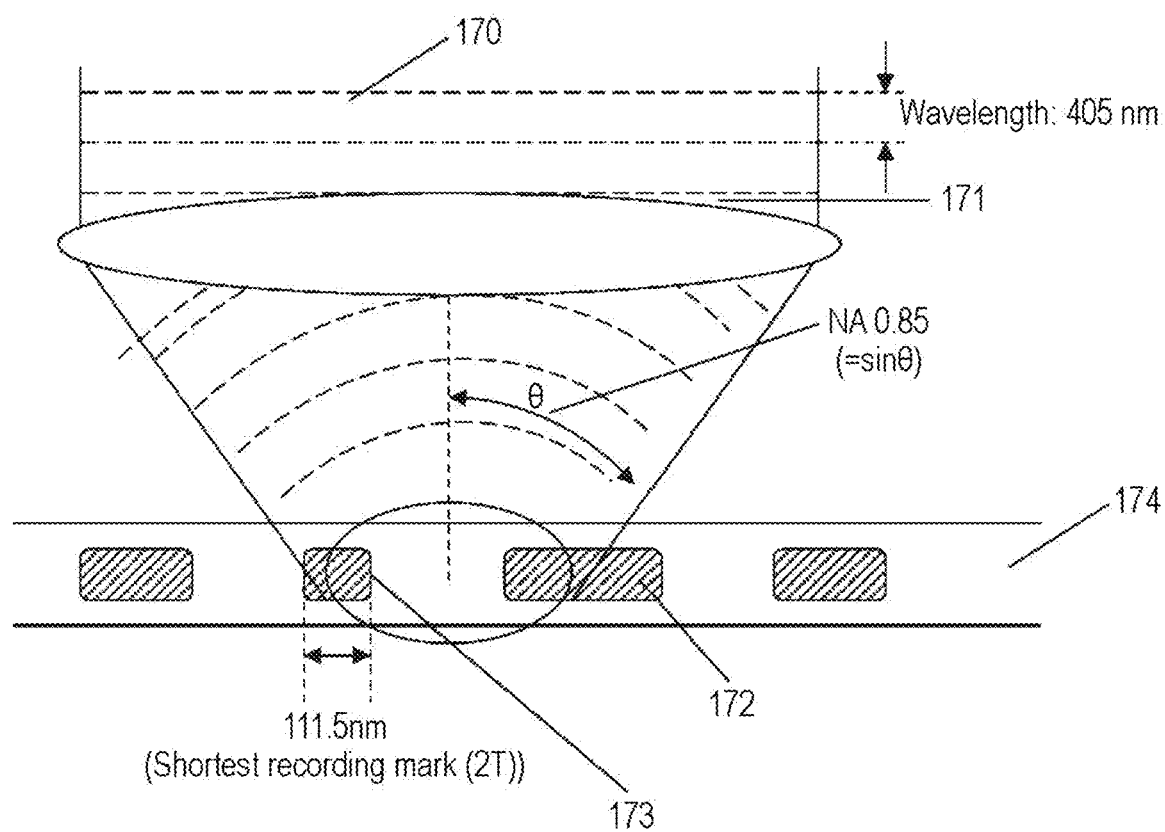
FIG. 13 shows a BD as an example optical disc having a recording capacity 100 GB.

This exemplary embodiment will be described for a BD as an example optical disc whose recording layer has a three-layer structure and which has a recording capacity 100 GB. FIG. 13 shows that the wavelength of a laser light beam 170 incident on the optical disc is 405 nm, the numerical aperture (NA) of an object lens 171 is 0.85, and the length of a shortest recording mark (2 T) 173 among recording marks 172 having various lengths that are formed on a recording track is 111.5 nm. In this optical disc, the recording capacity per information recording layer is 33.4 GB.

An OTF (optical transfer function) cutoff frequency of this optical disc will be described below.

The OTF cutoff frequency is exceeded if the reference length T becomes so short as to a relationship $$P < \lambda/2NA$$

is satisfied, where $\lambda$ is the laser wavelength (405±5 nm (400 to 410 nm)), NA is the numerical aperture (0.85±0.01 (0.84 to 0.86), and P is the shortest mark length plus the shortest space length (in the case of 17 modulation, P=2 T+2 T=4 T).

When NA=0.85 and $\lambda$=405 nm, the reference length T that corresponds to the OTF cutoff frequency is $$T=405/(2\times0.85)/4=59.558 \text{ nm.}$$

A recording capacity below which the spatial frequency of the shortest recording mark is higher than the OTF cutoff frequency corresponds to about 31 GB with the same laser wavelength and numerical aperture as of the BD. In the BD shown in FIG. 13, since its recording capacity is 33.4 GB, the spatial frequency of the shortest recording mark is higher than the OTF cutoff frequency.

Figure 14:
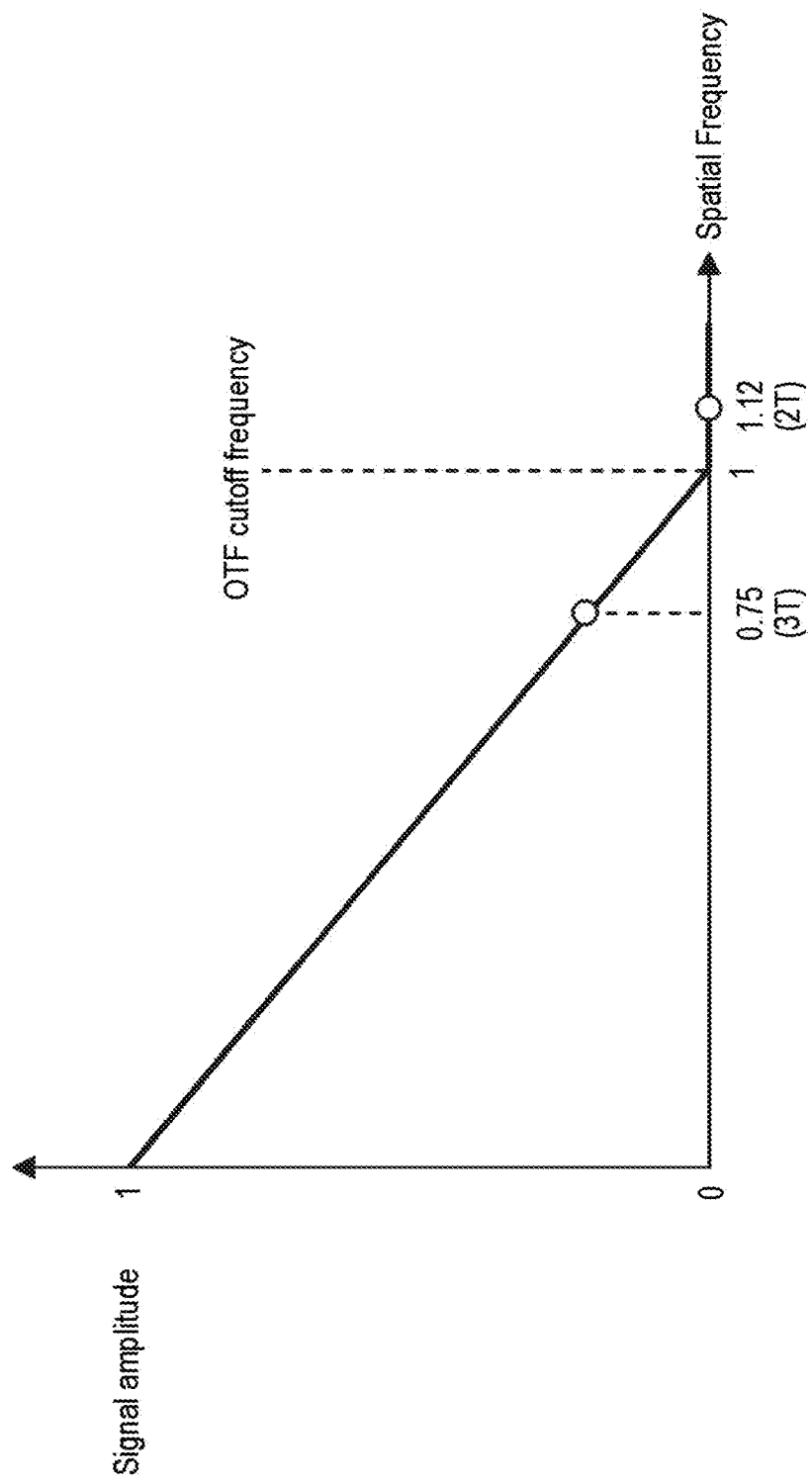
FIG. 14 is a graph showing a frequency characteristic of a case that reproduction is performed under the conditions shown in FIG. 13.

FIG. 14 is a graph showing a frequency characteristic of a case that reproduction is performed under the conditions shown in FIG. 13. The horizontal axis is the spatial frequency and the vertical axis is the signal amplitude normalized by a maximum amplitude. The signal amplitude decreases as the spatial frequency increases, and becomes equal to 0 at the OTF cutoff frequency.

Since the frequency of a continuous signal of shortest marks (2 T) is higher than the OTF cutoff frequency, the signal amplitude is equal to 0. At a frequency of a continuous signal of 3 T marks is lower than the OTF cutoff frequency, the signal amplitude is larger than 0 though it is small. As show in FIG. 14, the 2 T succession frequency and the 3 T succession frequency are equal to 1.12 and 0.75, respectively, in terms of the OTF cutoff frequency (=1).

Figure 15:
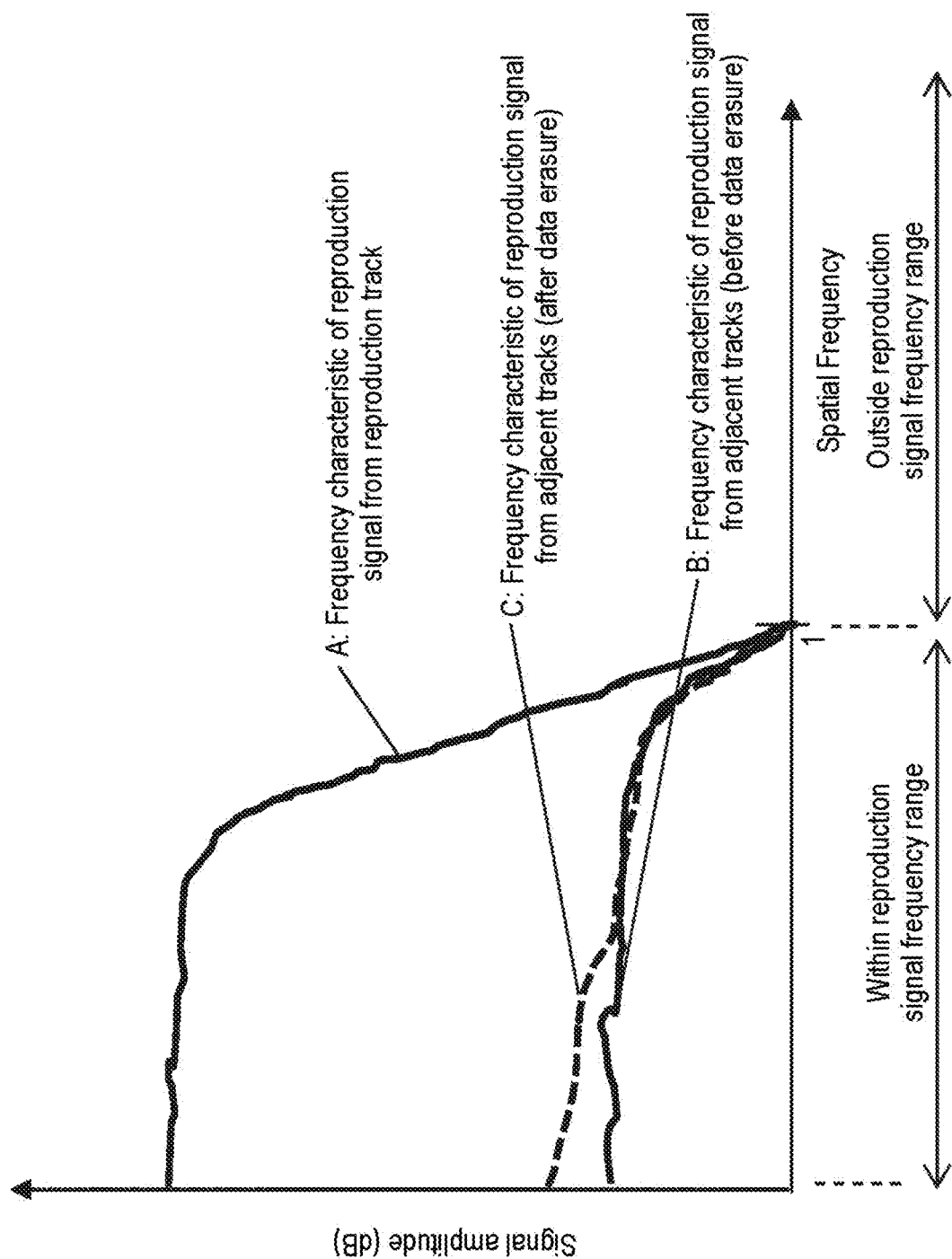
FIG. 15 is a graph showing frequency characteristics of signals that are obtained from a reproduction track and adjacent tracks under the conditions shown in FIG. 13.
Figure 16:
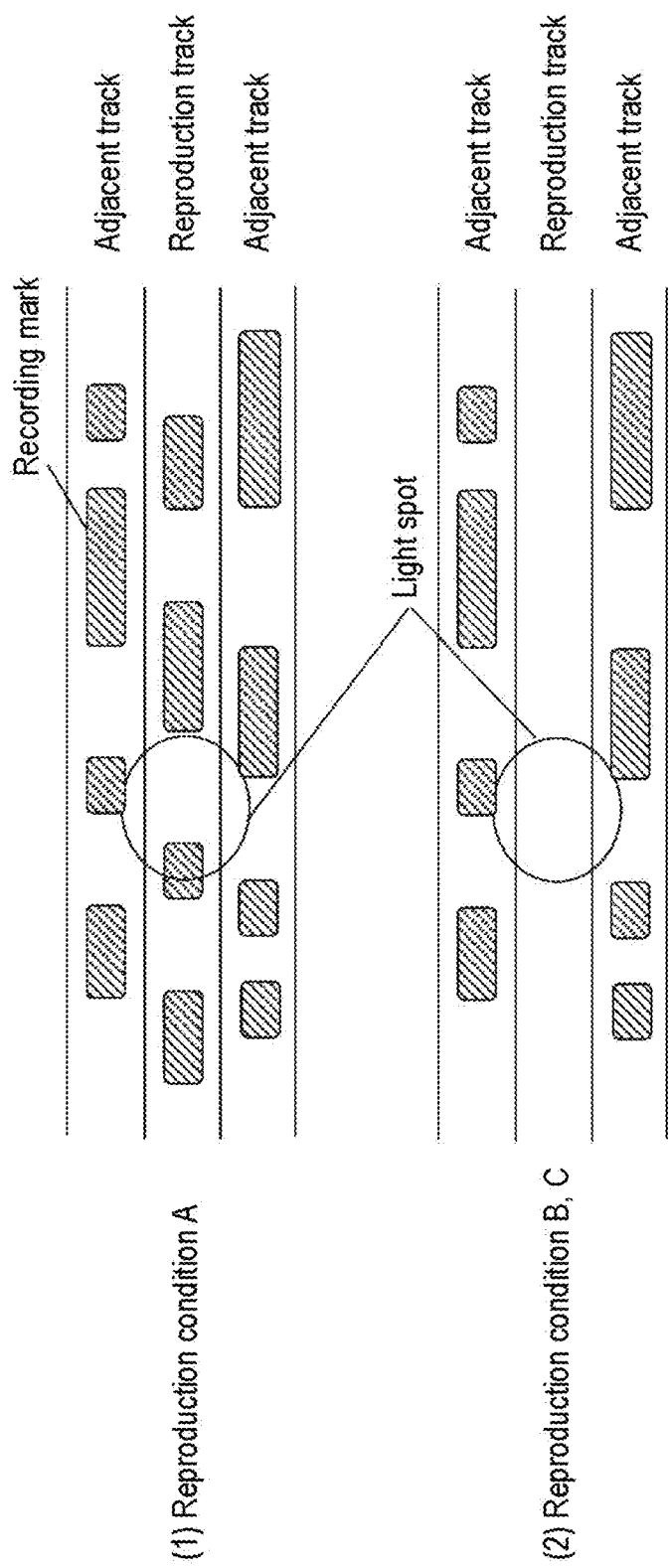
FIG. 16 shows sets of tracks for which the frequency characteristics shown in FIG. 15 were measured.

FIG. 15 is a graph showing frequency characteristics of signals that are obtained from a reproduction track and adjacent tracks under the conditions shown in FIG. 13. The horizontal axis is the spatial frequency and the vertical axis is the signal amplitude in dB. Curve A shown in FIG. 15 represents a frequency characteristic of a reproduction signal obtained from a reproduction track in a state that a light beam is located thereon. Curve A shows that the signal amplitude is equal to 0 in a frequency range that is higher than the OTF cutoff frequency. Part (1) of FIG. 16 illustrates a reproduction condition corresponding to curve A shown in FIG. 15. Recording data (recording marks) are recorded on three tracks and reproduction is performed by applying a light beam to the central track.

Curve B shown in FIG. 15 represents a frequency characteristic of a reproduction signal obtained from only tracks adjacent to a reproduction track in a state that a light beam is located on the reproduction track (no recording marks are formed on the reproduction track). Part (2) of FIG. 16 illustrates a reproduction condition corresponding to curves B and C shown in FIG. 15. Recording data (recording marks) are recorded on two adjacent tracks and reproduction is performed by applying a light beam to the central track.

As shown in FIG. 15, it is seen that when a signal is reproduced from the reproduction track, signal leakage occurs from the tracks adjacent to it. This leakage is called crosstalk which is noise that degrades the quality of a signal reproduced from the reproduction track.

Where crosstalk noise affects reproduction quality to a large extent, a problem arises in the above-described technique according to the first embodiment. As shown in part (C) of FIG. 5, longer recording marks were newly formed in regions where no recording marks had been formed. It was described that overwriting that disables data reproduction is realized by disabling data synchronization by forming patterns that are different from patterns of an original frame synchronization signal. When such overwriting is performed, crosstalk noise increases in the signal frequency range, as a result of which the quality of a signal reproduced from the reproduction track is degraded. Curve C shown in FIG. 15 indicates that crosstalk noise increases in a low-frequency region of the signal frequency range when overwriting is performed using long recording marks. Since in general overwriting is performed in units of a file, there may occur a case that data of the reproduction track adjacent to an adjacent track needs to be reproduced when the adjacent track was overwritten.

The second exemplary embodiment provides an overwriting method capable of suppressing such crosstalk noise occurring in the signal frequency range. In this method, overwriting is performed using recording marks recorded with a higher frequency than the OTF cutoff frequency. According to this method, even if adjacent tracks were subjected to overwriting, crosstalk noise does not increase in the signal frequency range of data of the reproduction track and necessary quality of reproduction of a signal reproduced from the reproduction track can be maintained.

Figure 17:
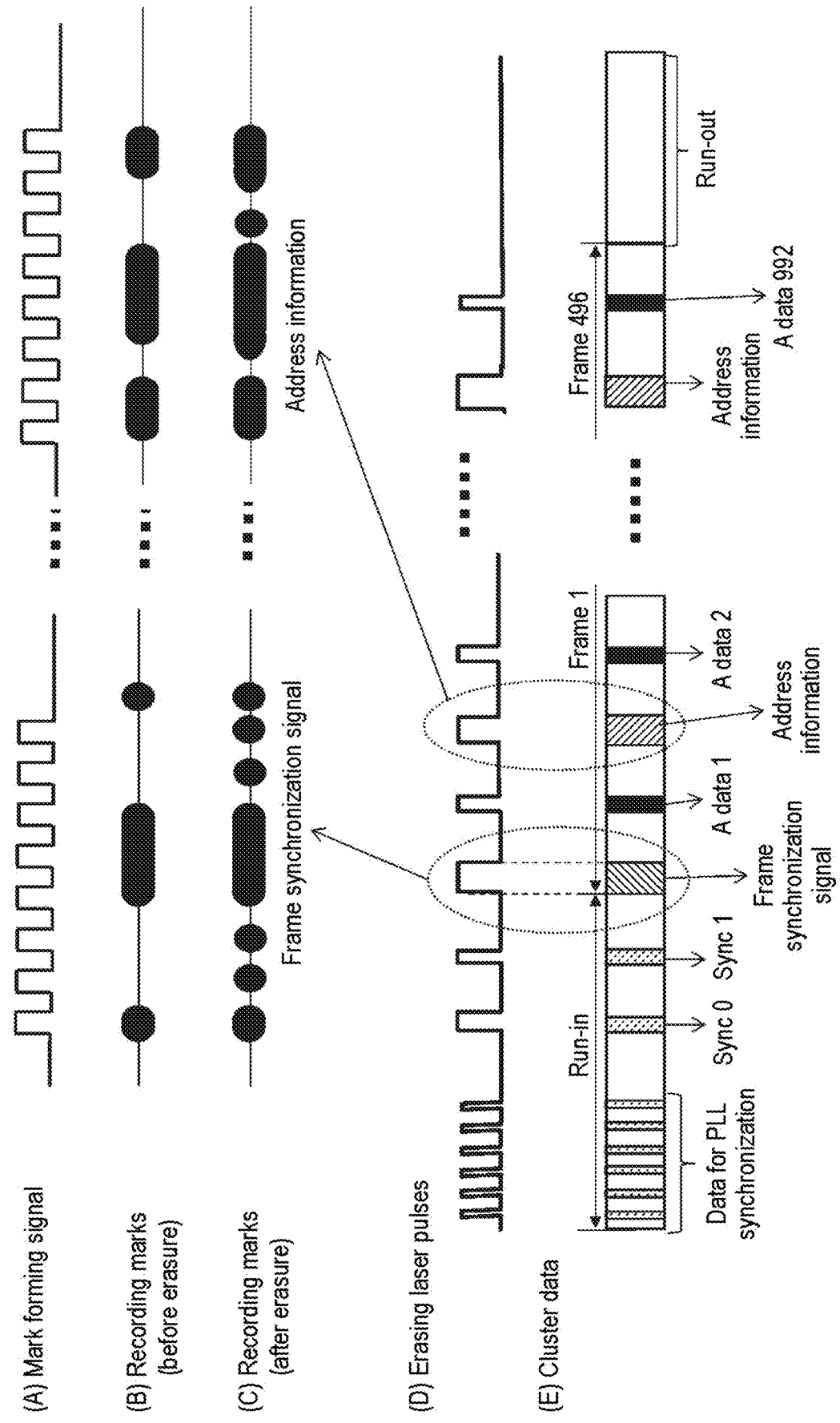
FIG. 17 illustrates how to erase particular data of cluster data in a second exemplary embodiment.

FIG. 17 illustrates how particular data of cluster data are corrupted for data erasure. Since the operation illustrated by FIG. 17 is similar to that illustrated by FIG. 5, only differences will be described below. Part (A) of FIG. 17 shows a recording mark forming signal. Whereas the recording mark forming signal shown in part (A) of FIG. 5 is for formation of long recording marks, that shown in Part (A) of FIG. 17 is for formation of a succession of short recording marks (e.g., 2 T). Since it suffices to form recording marks at a frequency that is higher than the OTF cutoff frequency, the invention is not limited to the case of forming 2 T recording marks.

Part (C) of FIG. 17 shows a recording state, after erasure, of recording marks. Whereas in part (C) of FIG. 5 long recording marks are formed as recording marks having a different pattern, in part (C) of FIG. 17 short recording marks are formed as recording marks having a different pattern.

Since the frame synchronization signal is corrupted by overwriting in the above-described manner, binary data corresponding to the frame synchronization signal is not read out from the region of the corrupted frame synchronization signal. As a result, it becomes difficult or impossible for the channel synchronization circuit 121 to detect the frame synchronization signal and hence to determine a frame start position. Although the above description is directed to only the frame synchronization signal and the address information, overwriting of cluster data may be performed in a manner similar to the manner shown in FIG. 7 using recording marks whose frequency is higher than the OTF cutoff frequency.

Third Exemplary Embodiment

The configuration and operation of a third exemplary embodiment will be described below. Descriptions for what are the same as in the first exemplary embodiment will be omitted, that is, only differences will be described below.

In the first exemplary embodiment, how to corrupt part of the data in an LDC block was described with reference to FIG. 7. In the example shown in FIG. 7, parity is provided for data of one vertical column (LDC codeword) in an LDC block and error correction using the parity is disabled by overwriting part of the data in the LDC block by paying attention to only the vertical one column.

This exemplary embodiment proposes that disables error correction reliably by overwriting part of the data for an error correction format having a structure that error correction parity includes internal parity PI extending in the recording direction and external parity PO extending in the direction perpendicular to the recording direction. The error correction format in which the error correction parity includes both of the internal parity PI and the external parity PO is a format that is employed in, for example, the DVD (Digital Versatile Disc). A description will be made of an operation that is performed in the case where the error correction circuit 123 shown in FIG. 1 (first exemplary embodiment) is modified.

Figure 18:
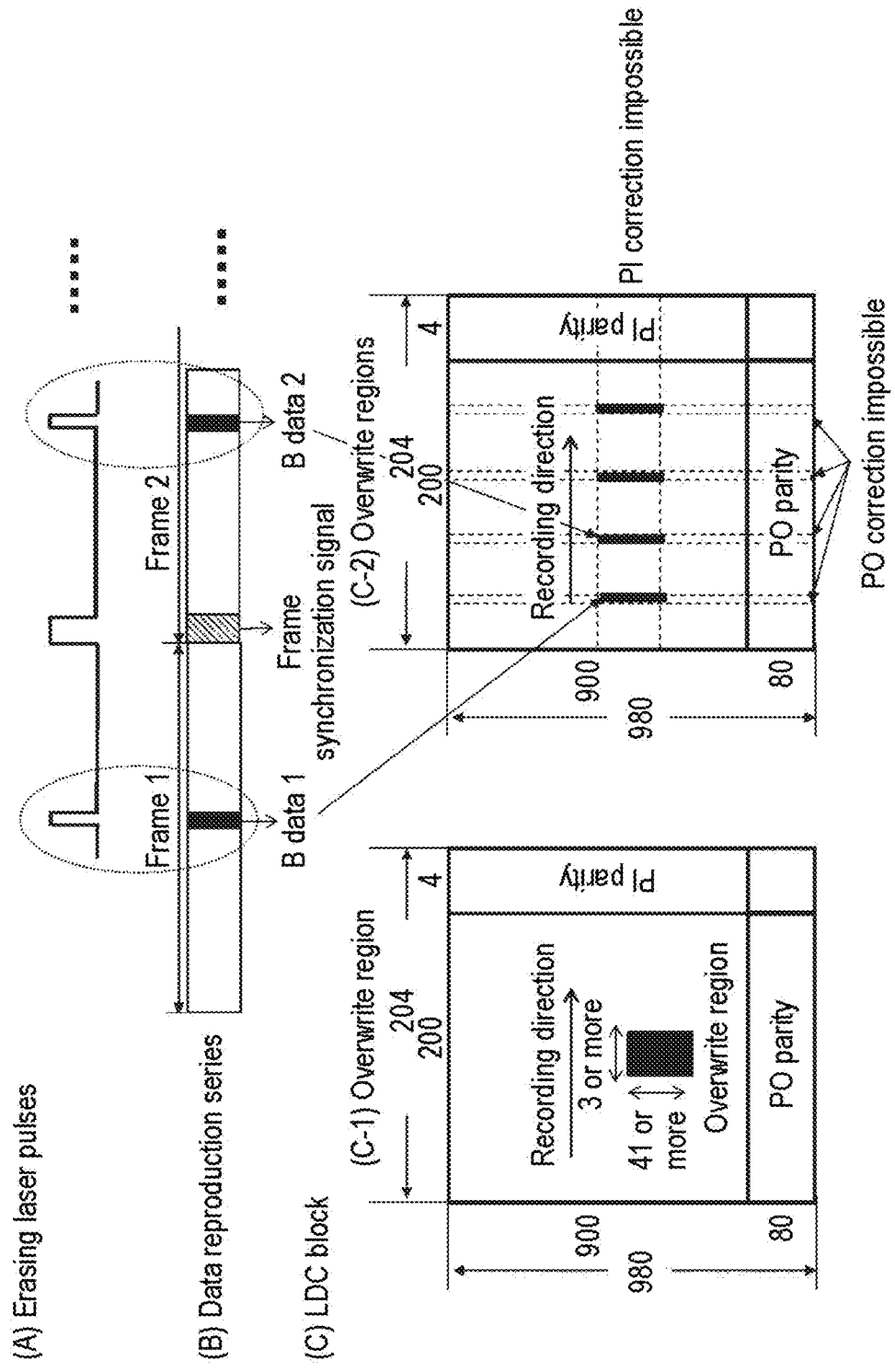
FIG. 18 illustrates how to erase particular data of cluster data in a third exemplary embodiment.

FIG. 18 illustrates an error correction format of a case that the LDC block shown in part (C) of FIG. 7 is changed so that the parity includes internal parity PI and external parity PO. In an example format shown in part (C) of FIG. 18, four of 204 symbols arranged in the horizontal direction constitute internal parity PI and 80 of 980 symbols arranged in the vertical direction constitute external parity PO. Since parity enables error correction as long as the number of errors is smaller than or equal to half of the number of parity symbols, the internal parity PI can correct an error of up to two symbols and the external parity PO can correct an error of up to 40 symbols.

In error correction processing, PO-side correction (vertical column) is performed and then PI-side error correction (horizontal row) is performed repeatedly. When the number of error symbols is small, error correction processing is completed by merely performing PO-side correction only once. When the number of error symbols is large, error correction processing is completed by performing PO-side error correction and PI-side error correction alternately plural times. Naturally, when the number of error symbols is larger than or equal to a prescribed number, error correction processing may not be completed correctly. This results in a reproduction error and data cannot be reproduced.

According to this format, overwriting is performed on part of data so that error correction processing does not finish correctly even if PO-side error correction (vertical column) and PI-side error correction (horizontal row) alternately plural times. Overwriting is performed so as to produce error symbols the number of which exceeds half of parity symbols in a region(s) where internal parity PI and external parity PO cross each other. In the example shown in part (C) of FIG. 18, the internal parity PI is of three symbols or more and external parity PO is of 41 symbols of more.

Furthermore, in the example shown in part (C-1) of FIG. 18, overwriting is performed continuously in the recording direction. Necessary servo stability of overwriting is secured by setting a prescribed interval between adjacent overwrite regions in the recording direction. In the example shown in part (C-2) of FIG. 18, a prescribed interval is set between each pair of adjacent overwrite regions in the recording direction. The prescribed interval may be determined taking servo stability into consideration.

The LDC block format employed in the third exemplary embodiment of the invention is not limited to the one shown in part (C) of FIG. 18. The number of overwrite symbols may be determined under the condition that error symbols are produced in a number that exceeds half of parity symbols in a region(s) where internal parity PI and external parity PO cross each other and taking servo stability into consideration.

How data erasure is performed on the optical disc 101 in this exemplary embodiment will be described with reference to FIG. 19.

How data erasure is performed will be described in the same manner as done in the first exemplary embodiment with reference to FIG. 4. Part (A) of FIG. 19 shows an erasing pattern 50*d* using which erasure target cluster data is to be overwritten. Symbols "x" shown in part (A) of FIG. 19 indicate positions where marks should be formed to corrupt particular data. Part (B) of FIG. 19 is a time-series version of the erasing pattern 50*d* shown in part (A) of FIG. 19. When data to be erased on the optical disc 101 are overwritten using the erasing pattern 50*d*, data of frame synchronization signals 55 and part of user data are corrupted as shown in part (C) of FIG. 19.

Thus, when it is intended to reproduce data from an erased region of the optical disc 101, since a sector synchronization signal and the frame synchronization signals 55 are corrupted, frame synchronization cannot be made, resulting in reproduction error (part (D) of FIG. 19). Even if no reproduction error is caused by failed frame synchronization, the LDC block is corrupted in both of the vertical direction (PO) and the horizontal direction (PI) to such an extent that error correction cannot be made, errors that were produced in part of the LDC block (i.e., part of the user data) cannot be corrected, resulting in a reproduction error (part (F) of FIG. 19).

Although PO error correction and PI error correction are performed alternately plural times, the error correction processing does not finish normally, that is, a reproduction error occurs. Even if no reproduction error occurs in the error correction processing, read-out user data 50 has not gone through correct error correction and hence is different from true data. Necessary security can thus be secured.

As described above, since data necessary for reproduction synchronization and error correction such as frame synchronization signals and part of user data of cluster data are corrupted, reproduction of the user data can be disabled reliably, which causes the same effect as data erasure. Furthermore, since cluster data is subjected overwriting in a small region(s), the amount of newly recorded recording marks can be reduced. Thus, a variation of the ratio between recording marks and spaces (50:50) in a recording layer can be suppressed, whereby data erasure (invalidation) can be performed without affecting a servo control.

Other Exemplary Embodiments

As described above, the description is made of the first exemplary embodiment as illustration of the technology disclosed in the present application. However, the technology in the present disclosure is not limited to this, and is applicable also to exemplary embodiments, which are appropriately subjected to alteration, replacement, addition, omission, and the like. Moreover, it is also possible to form new exemplary embodiments by combining the constituents and functions, which are described in the foregoing first exemplary embodiment, with other constituents.

For example, system controller 115 is described to be an electronic circuit designed as a function specific hardware, however, may be a processor such as a CPU (central processing unit) and an MPU (micro processing unit), which realizes the predetermined function in cooperation with software (program).

Moreover, types and disposed positions of the frame synchronization signal and the address information in the data, which is recorded in the optical disc, and a type and position of the error correction coding, which is performed for the user data, are not limited to those, which are disclosed above, either.

Moreover, the idea of the above-described erasing control is applicable not only to the BD disc (Blu-ray disc) but also to a DVD (digital versatile disc) and other types of the write-once optical discs.

As described above, the description is made of the exemplary embodiments as the illustration of the technology disclosed in the present disclosure. For this purpose, the accompanying drawings and the detailed description are provided. Hence, the constituents described in the accompanying drawings and the detailed description can include not only constituents, which are essential for solving the problem, but also constituents, which are provided for illustrating the above-described technology, and are not essential for solving the problem. Therefore, it should not be immediately recognized that such non-essential constituents are essential based on the fact that the non-essential constituents are described in the accompanying drawings and the detailed description.

Moreover, the above exemplary embodiments are those for illustrating the technology in the present disclosure, and accordingly, can be subjected to varieties of alterations, replacements, additions, omissions and the like within the scope of claims or within the scope of equivalents thereof.

The present disclosure is applicable to a device for erasing data recorded in a write-once optical disc.

What is claimed is:

1. An information recording device capable of erasing data recorded on a write-once optical disc, comprising:
   a receiver that receives an erase command in which an erase start position and a size of data to be erased are designated;
   an optical head that forms a recording mark on the optical disc; and
   a controller that controls formation of the recording mark on the optical disc,
   wherein, when receiving the erase command, the controller erases data of an erased area by overwriting data in an information area, to corrupt the data in the information area, using an erasing pattern, the information area including information necessary for data reproduction, and the erased area being specified by the erase start position and the size of the data to be erased on the optical disc; and
   wherein the data in the information area is arranged as partial data in a series of data arranged in a direction of internal parity of error correction so that correction is disabled in both of a correction processing by the internal parity of the error correction and a correction processing by external parity of the error correction when the data in the information area is overwritten using the erasing pattern.

2. The information recording device according to claim 1, wherein the erasing pattern has a higher frequency than a reproduction frequency range to the optical disc by the optical head.

3. The information recording device according to claim 1, wherein the data in the information area is arranged in a region where the internal parity and the external parity cross each other.

4. The information recording device according to claim 3, wherein the data in the information area is overwritten using the erasing pattern so as to produce error symbols the number of which exceeds half of parity symbols in the region.

5. A data erasing method for erasing data recorded on a write-once optical disc, the data erasing method comprising:
   receiving an erase command in which an erase start position and a size of data to be erased are designated; and
   corrupting data in an information area by overwriting the data in the information area using an erasing pattern having a higher frequency than a reproduction frequency range to the optical disc by an optical head thereby erasing the data in an erased area of the information area, the information area including information necessary for data reproduction, and the erased area being specified by the erase start position and the size of the data to be erased on the optical disc,
   wherein the data in the information area is arranged as partial data in a series of data arranged in a direction of internal parity of error correction so that correction is disabled in both of a correction processing by the internal parity of the error correction and a correction processing by external parity of the error correction when the data in the information area is overwritten using the erasing pattern.

6. The data erasing method according to claim 5, wherein the data in the information area is arranged in a region where the internal parity and the external parity cross each other.

7. The data erasing method according to claim 6, wherein in the corrupting process, the data in the information area is overwritten using the erasing pattern so as to produce error symbols the number of which exceeds half of parity symbols in the region.

8. A data erasing method for erasing data recorded on a write-once optical disc, the data erasing method comprising:
   receiving an erase command in which an erase start position and a size of data to be erased are designated; and
   corrupting data in an information area by overwriting the data in the information area using an erasing pattern thereby erasing the data in an erased area of the information area, the information area including information necessary for data reproduction, and the erased area being specified by the erase start position and the size of the data to be erased on the optical disc,
   wherein the data in the information area is arranged as partial data in a series of data arranged in a direction of internal parity of error correction so that correction is disabled in both of a correction processing by the internal parity of the error correction and a correction processing by external parity of the error correction when the data in the information area is overwritten using the erasing pattern.

9. The data erasing method according to claim 8, wherein the data in the information area is arranged in a region where the internal parity and the external parity cross each other.

10. The data erasing method according to claim 9, wherein in the corrupting process, the data in the information area is overwritten using the erasing pattern so as to produce error symbols the number of which exceeds half of parity symbols in the region.

* * * * *